(12) United States Patent
Mochizuki et al.

(10) Patent No.: US 8,880,029 B2
(45) Date of Patent: Nov. 4, 2014

(54) WIRELESS BASE STATION, WIRELESS COMMUNICATION SYSTEM, WIRELESS COMMUNICATION METHOD, AND COMPUTER-READABLE MEDIUM STORING DEVICE

(75) Inventors: Koichi Mochizuki, Kasukabe (JP); Masahide Mochizuki, legal representative, Kasukabe (JP); Sumiko Mochizuki, legal representative, Kasukabe (JP); Hiroaki Kuwano, Surrey (GB); Atsushi Nakata, Tokyo (JP)

(73) Assignee: NEC Corporation, Tokyo (JP)

(*) Notice: Subject to any disclaimer, the term of this patent is extended or adjusted under 35 U.S.C. 154(b) by 171 days.

(21) Appl. No.: 13/379,544

(22) PCT Filed: May 14, 2010

(86) PCT No.: PCT/JP2010/003291
§ 371 (c)(1),
(2), (4) Date: May 25, 2012

(87) PCT Pub. No.: WO2010/150455
PCT Pub. Date: Dec. 29, 2010

(65) Prior Publication Data
US 2013/0244639 A1  Sep. 19, 2013

(30) Foreign Application Priority Data
Jun. 26, 2009  (JP) .................... 2009-152266

(51) Int. Cl.
H04M 1/66 (2006.01)
H04W 76/02 (2009.01)
H04W 88/02 (2009.01)
H04W 84/04 (2009.01)

(52) U.S. Cl.
CPC .............. *H04W 88/02* (2013.01); *H04W 76/02* (2013.01); *H04W 84/045* (2013.01)
USPC ........ 455/411; 455/421; 455/466; 455/456.4; 455/419; 455/444

(58) Field of Classification Search
USPC .......... 455/418, 422.1, 428, 445, 456.5, 466, 455/525, 567, 421, 419–420, 410–411, 455/444; 370/328, 338, 401
See application file for complete search history.

(56) References Cited

U.S. PATENT DOCUMENTS 5,659,595 A * 8/1997 Chanu et al. .................. 455/411
5,819,173 A * 10/1998 Lawrence et al. ............. 455/515
(Continued)

FOREIGN PATENT DOCUMENTS

CN      1842215 A    10/2006
CN    101437277 A     5/2009
(Continued)

OTHER PUBLICATIONS

International Search Report in PCT/JP2010/003291 dated Aug. 7, 2010 (English Translation Thereof).

(Continued)

*Primary Examiner* — Sharad Rampuria
(74) *Attorney, Agent, or Firm* — McGinn IP Law Group, PLLC

(57) ABSTRACT

A wireless communication system includes a wireless base station FAP2 which communicates with a mobile communication terminal UE1; a core network apparatus CN4 which is a higher-level apparatus of the wireless base station; and a femto wireless base station gateway GW3 which relays between the FAP2 and the core network apparatus CN4. The wireless base station FAP2 includes a determination unit 21*a* which determines whether to stop voice call reception processing or voice call transmission processing with reference to determination information upon detection of a voice call reception to the mobile communication terminal UE1 within a communication service area or a voice call transmission from the mobile communication terminal UE1 within the communication service area in the FAP2; and a signal processing unit 25*a* which informs a higher-level apparatus of a message including a determination result when the determination unit determines to stop the processing.

14 Claims, 10 Drawing Sheets

(56) References Cited

U.S. PATENT DOCUMENTS

| | | | |
|---|---|---|---|
| 6,011,973 A * | 1/2000 | Valentine et al. | 455/456.6 |
| 6,542,730 B1 * | 4/2003 | Hosain | 455/410 |
| 6,832,093 B1 * | 12/2004 | Ranta | 455/456.4 |
| 6,993,329 B2 | 1/2006 | Cho et al. | |
| 7,039,425 B1 * | 5/2006 | Mazawa et al. | 455/456.4 |
| 7,421,270 B2 * | 9/2008 | Serafat et al. | 455/419 |
| 7,873,351 B2 * | 1/2011 | Yahagi | 455/411 |
| 8,112,785 B1 * | 2/2012 | Cooley et al. | 726/1 |
| 8,355,728 B2 * | 1/2013 | Jung et al. | 455/444 |
| 2003/0139138 A1 | 7/2003 | Cho et al. | |
| 2006/0223519 A1 * | 10/2006 | Yahagi | 455/421 |
| 2008/0220818 A1 * | 9/2008 | Kono | 455/561 |
| 2009/0298475 A1 * | 12/2009 | Czaja et al. | 455/412.2 |
| 2010/0159917 A1 * | 6/2010 | Majmundar et al. | 455/423 |

FOREIGN PATENT DOCUMENTS

| | | |
|---|---|---|
| JP | 10-234082 A | 9/1998 |
| JP | 2000-324549 A | 11/2000 |
| JP | 2001-045563 A | 2/2001 |
| JP | 2003-535551 A | 11/2003 |
| JP | 2005-130212 A | 5/2005 |
| WO | WO 01/93440 A1 | 12/2001 |

OTHER PUBLICATIONS

Chinese First Office Action dated Dec. 20, 2013 with English translation.

Japanese Notification of Reasons for Refusal, dated Feb. 4, 2014 with English translation.

* cited by examiner

WIRELESS BASE STATION, WIRELESS COMMUNICATION SYSTEM, WIRELESS COMMUNICATION METHOD, AND COMPUTER-READABLE MEDIUM STORING DEVICE

TECHNICAL FIELD

The present invention relates to a wireless base station, such as a femto wireless base station that controls an incoming call to a mobile communication terminal within a communication service area or an outgoing call from the mobile communication terminal, a wireless communication system, a wireless communication method, and a computer-readable medium storing a program.

BACKGROUND ART

In a specific location, such as a train, a library, a museum, or a theater, it is not desirable to make a voice call conversation. For this reason, each user of a mobile communication terminal, such as a portable phone, (hereinafter referred to as "portable phone") is required to turn off the mobile communication terminal or to set it to a silent mode. When the portable phone is turned off, however, it is not certain whether an incoming call has been received until the portable phone is turned on again, even if there is an incoming call. This may result in a delay of a response to an important call, which is a significant disadvantage for a business user.

When the portable phone is set to the silent mode, a receiver may talk on the phone upon receiving a call, which causes any public nuisance. Therefore, in any case, it is difficult to reliably inhibit a voice call reception, since each user is allowed to configure the setting of his/her portable phone.

Accordingly, conventional portable phone systems are required to have a function of inhibiting a voice call reception in a specific location. For example, in a base station and a portable communication terminal which are disclosed in Patent Literature 1, the base station having a telephone answering function to transmit silent incoming call information is configured for the terminal existing in the base station within an area in which ring tone or communication is inhibited. Further, the portable communication terminal is provided with means for informing and receiving a call by vibration, light, or display of character information onto a light-receiving unit upon receiving a signal from the base station that transmits the silent incoming call information.

Additionally, Patent Literature 2 discloses a mobile communication system in which a particular base station that covers a particular area is not connected to another base station and a higher-level apparatus. The mobile communication system disclosed in this patent literature includes a particular base station (stand-alone) which is not connected to a higher-level apparatus and cannot communicate with the higher-level apparatus. A call transmission and reception service for a mobile station within a communication service area of the particular base station (the position of the mobile station is registered) are stopped because the particular base station is not connected to the higher-level apparatus. When the mobile station within the communication service area of the particular base station (the position of the mobile station is registered) needs to establish communication, the communication service area of the particular base station is released by an operation of the mobile station, which allows the base station to be located within a communication service area of a normal base station. In this case, the mobile station informs the normal base station of an area characteristic code received from the particular base station. The area characteristic code is configured such that refusal of service, such as prohibition of transmission of emails or prohibition of connection to the Internet, is set depending on areas such as a hospital, a train, and a library. The normal base station determines the necessity to limit the service based on the area characteristic code received from the mobile station.

CITATION LIST

Patent Literature

[Patent Literature 1] Japanese Unexamined Patent Application Publication No. 2001-045563
[Patent Literature 2] Japanese Unexamined Patent Application Publication No. 2005-130212

SUMMARY OF INVENTION

Technical Problem

However, Patent Literature 1 is based on the premise that the portable communication terminal can receive and process the silent incoming call information, and thus is low in feasibility. This is because no consideration is made on terminals having no function of processing the silent incoming call information, and it is difficult to provide the service if terminals having the function of processing the silent incoming call information and terminals having no such a function coexist in the base station.

Patent Literature 2 requires a particular base station of stand-alone type. In the patent literature, the call transmission and reception service is not provided to any mobile station within the communication service area of the specific base station (the position of the mobile station is registered). Accordingly, even when there is a need for an emergency contact, for example, it is impossible to make contact. If the owner of the mobile station needs to establish communication, it is necessary for the owner to switch the particular mobile station to the normal base station and to carry out the limitation of the service. Furthermore, operation and information from the mobile station are required, which complicates the processing.

The present invention has been made to solve the above-mentioned problems, and has an object to provide a wireless base station, a wireless communication system, a wireless communication method, and a computer-readable medium storing a program which are capable of limiting the service in a specific location without changing any function of a mobile communication terminal.

Solution to Problem

A wireless base station according to an exemplary aspect of the present invention includes: determination means for determining whether to stop voice call reception processing or voice call transmission processing with reference to determination information upon detection of a voice call reception to a mobile communication terminal within a communication service area or a voice call transmission from the mobile communication terminal within the communication service area; and signal processing means for informing a higher-level apparatus of a message including a determination result when the determination means determines to stop the processing.

A wireless communication system according to an exemplary aspect of the present invention includes: a wireless base station which communicates with a mobile communication terminal; a core network apparatus which is a higher-level apparatus of the wireless base station; a gateway which relays between the wireless base station and the core network apparatus; and an SMS mail server which is connected to the core network apparatus, in which the wireless base station includes: call transmission and reception number acquiring means for acquiring call transmission and reception number information from a call setting request signal sent from the core network apparatus after detecting a voice call reception to the mobile communication terminal within a communication service area or a voice call transmission from the mobile communication terminal within the communication service area; determination means for determining whether to stop voice call reception processing or voice call transmission processing with reference to determination information; and signal processing means for informing the core network apparatus of a message including a determination result when the determination means determines to stop the processing, the signal processing means sends a control signal including the call transmission and reception number acquired by the call transmission and reception number acquiring means to the SMS mail server through the core network apparatus, and the SMS mail server performs a receiver side SMS delivery control and/or a caller side SMS delivery control based on the control signal, the receiver side SMS delivery control being a control in which the SMS mail server informs the mobile communication terminal having received an incoming call of a stop of the voice call reception processing, the caller side SMS delivery control being a control in which the SMS mail server informs a terminal of a caller of a stop of the voice call transmission processing.

A wireless communication system according to an exemplary aspect of the present invention includes: a wireless base station which communicates with a mobile communication terminal; a core network apparatus which is a higher-level apparatus of the wireless base station; a gateway which relays between the wireless base station and the core network apparatus; and an SMS mail server which is connected to the core network apparatus, in which the wireless base station includes: call transmission and reception number acquiring means for acquiring call transmission and reception number information from a call setting request signal sent from the core network apparatus after detecting a voice call reception to the mobile communication terminal within a communication service area or a voice call transmission from the mobile communication terminal within the communication service area; determination means for determining whether to stop voice call reception processing or voice call transmission processing with reference to determination information; and signal processing means for informing the core network apparatus of a message including a determination result when the determination means determines to stop the processing, the signal processing means sends a control signal including the call transmission and reception number acquired by the call transmission and reception number acquiring means to the core network apparatus, the core network apparatus includes: informing means for establishing communication with the SMS mail server and performing a receiver side SMS delivery control and/or a caller side SMS delivery control through the SMS mail server, the receiver side SMS delivery control being a control in which the informing means informs the mobile communication terminal having received an incoming call of a stop of the voice call reception processing, the caller side SMS delivery control being a control in which the informing means informs a terminal of a caller of a stop of the voice call transmission processing, and the informing means establishes communication with a terminal having made an outgoing call to the mobile communication terminal within the communication service area or a terminal having received an incoming call from the mobile communication terminal within the communication service area, and informs the terminal having made the outgoing call to the mobile communication terminal within the communication service area or the terminal having received the incoming call from the mobile communication terminal within the communication service area of a stop of the voice call reception processing or the voice call transmission processing through the SMS mail server.

A wireless communication system according to an exemplary aspect of the present invention includes: a wireless base station which communicates with a mobile communication terminal; a core network apparatus which is a higher-level apparatus of the wireless base station; a gateway which relays between the wireless base station and the core network apparatus; and an SMS mail server which is connected to the core network apparatus, in which the wireless base station includes signal processing means for sending its own identification number to the core network apparatus after establishing communication among the mobile communication terminal, the wireless base station, the gateway, and the core network apparatus by a voice call reception to the mobile communication terminal within a communication service area or a voice call transmission from the mobile communication terminal within the communication service area, the core network apparatus includes: determination means which has information of a wireless base station including a forced silent mode for stopping voice call reception processing or voice call transmission processing of a terminal within a communication service area, and determines whether or not the wireless base station having sent the identification number is a target base station of the forced silent mode; and informing means for establishing communication with the SMS mail server and performing a receiver side SMS delivery control and/or a caller side SMS delivery control through the SMS mail server, when the wireless base station having sent the identification number is the target base station, the receiver side SMS delivery control being a control in which the informing means informs the mobile communication terminal having received an incoming call of a stop of the voice call reception processing, the caller side SMS delivery control being a control in which the informing means informs a terminal of a caller of a stop of the voice call transmission processing.

A wireless communication system according to an exemplary aspect of the present invention includes: a wireless base station which communicates with a mobile communication terminal; a core network apparatus which is a higher-level apparatus of the wireless base station; and a gateway which relays between the wireless base station and the core network apparatus, in which the wireless base station includes: call transmission and reception number acquiring means for acquiring call transmission and reception number information from a call setting request signal sent from the core network apparatus after detecting a voice call reception to the mobile communication terminal within a communication service area; determination means for determining whether to stop voice call reception processing or voice call transmission processing with reference to determination information; and signal processing means for establishing a data link not with the mobile communication terminal within the communication service area but only with the core network apparatus, when the determination means determines to stop the processing, and the signal processing means informs a terminal of a caller of a stop of the voice call reception through the core network apparatus.

A wireless communication system according to an exemplary aspect of the present invention includes: a wireless base station which communicates with a mobile communication terminal; a core network apparatus which is a higher-level apparatus of the wireless base station; and a gateway which relays between the wireless base station and the core network apparatus, in which the gateway includes: call transmission and reception number acquiring means for acquiring call transmission and reception number information from a call setting request signal sent from the core network apparatus after detecting a voice call reception to the mobile communication terminal within a communication service area or a voice call transmission from the mobile communication terminal within the communication service area in the wireless base station; determination means for determining whether to stop voice call reception processing or voice call transmission processing with reference to determination information; and signal processing means for informing the core network apparatus of a message including a determination result when the determination means determines to stop the processing, and the signal processing means performs a receiver side SMS delivery control and/or a caller side SMS delivery control by using the call transmission and reception number information acquired by the call transmission and reception number acquiring means, the receiver side SMS delivery control being a control in which the signal processing means informs the mobile communication terminal having received an incoming call of a stop of the voice call reception processing, the caller side SMS delivery control being a control in which the signal processing means informs a terminal of a caller of a stop of the voice call transmission processing.

A wireless communication method according to an exemplary aspect of the present invention includes: a determination step of determining whether to stop voice call reception processing or voice call transmission processing with reference to determination information upon detection of a voice call reception to a mobile communication terminal within a communication service area or a voice call transmission from the mobile communication terminal within the communication service area; and a signal processing step of informing a higher-level apparatus of a message including a determination result when the processing is determined to be stopped.

According to an exemplary aspect of the present invention, there is provided a wireless communication method of a wireless communication system which includes: a wireless base station which communicates with a mobile communication terminal; a core network apparatus which is a higher-level apparatus of the wireless base station; a gateway which relays between the wireless base station and the core network apparatus; and an SMS mail server which is connected to the core network apparatus, the method including: a call transmission and reception number acquiring step of acquiring, by the wireless base station, call transmission and reception number information from a call setting request signal sent from the core network apparatus after detecting a voice call reception to the mobile communication terminal within a communication service area or a voice call transmission from the mobile communication terminal within the communication service area; a determination step of determining, by the wireless base station, whether to stop voice call reception processing or voice call transmission processing with reference to determination information; and a signal processing step of informing, by the wireless base station, the core network apparatus of a message including a determination result when the processing is determined to be stopped. In the signal processing step, a control signal including the call transmission and reception number acquired in the call transmission and reception number acquiring means is sent to the core network apparatus through the core network apparatus, and the SMS mail server performs a receiver side SMS delivery control and/or a caller side SMS delivery control based on the control signal, the receiver side SMS delivery control being a control in which the SMS mail server informs the mobile communication terminal having received an incoming call of a stop of the voice call reception processing, the caller side SMS delivery control being a control in which the SMS mail server informs a terminal having made an outgoing call of a stop of the voice call transmission processing.

According to an exemplary aspect of the present invention, there is provided a wireless communication method of a wireless communication system which includes: a wireless base station which communicates with a mobile communication terminal; a core network apparatus which is a higher-level apparatus of the wireless base station; a gateway which relays between the wireless base station and the core network apparatus; and an SMS mail server which is connected to the core network apparatus, the method including: a call transmission and reception number acquiring step of acquiring, by the wireless base station, call transmission and reception number information from a call setting request signal sent from the core network apparatus after detecting a voice call reception to the mobile communication terminal within a communication service area or a voice call transmission from the mobile communication terminal within the communication service area; a determination step of determining, by the wireless base station, whether to stop voice call reception processing or voice call transmission processing with reference to determination information; a signal processing step of informing, by the wireless base station, the core network apparatus of a message including a determination result when the processing is determined to be stopped, the signal processing step including sending a control signal including the call transmission and reception number acquired in the call transmission and reception number acquiring step to the core network apparatus; and an informing step of establishing, by the core network apparatus, communication with the SMS mail server and performing a receiver side SMS delivery control and/or a caller side SMS delivery control through the SMS mail server, the receiver side SMS delivery control being a control in which the core network apparatus informs the mobile communication terminal having received an incoming call of a stop of the voice call reception processing, the caller side SMS delivery control being a control in which the core network apparatus informs a terminal of a caller of a stop of the voice call transmission processing, the informing step including establishing communication with a terminal having made an outgoing call to the mobile communication terminal within the communication service area or with a terminal having received an incoming call from the mobile communication terminal within the communication service area, and informing the terminal having made the outgoing call to the mobile communication terminal within the communication service area or the terminal having received the incoming call from the mobile communication terminal within the communication service area of a stop of the voice call reception processing or the voice call transmission processing through the SMS mail server.

According to an exemplary aspect of the present invention, there is provided a wireless communication method of a wireless communication system which includes: a wireless base station which communicates with a mobile communication terminal; a core network apparatus which is a higher-level apparatus of the wireless base station; a gateway which relays between the wireless base station and the core network apparatus; and an SMS mail server which is connected to the core network apparatus, the method including: a signal processing step of sending, by the wireless base station, sending its own identification number to the core network apparatus after establishing communication among the wireless base station, the mobile communication terminal, the wireless base station, the gateway, and the core network apparatus by a voice call reception to the mobile communication terminal within a communication service area or a voice call transmission from the mobile communication terminal within the communication service area; a determination step of determining, by the core network apparatus, whether or not the wireless base station having sent the identification number is a target base station of a forced silent mode with reference to information of a wireless base station including the forced silent mode for stopping voice call reception processing or voice call transmission processing of a terminal within a communication service area; and an informing step of establishing, by the core network apparatus, communication with the SMS mail server and performing a receiver side SMS delivery control and/or a caller side SMS delivery control through the SMS mail server, when the wireless base station having sent the identification number is the target base station, the receiver side SMS delivery control being a control in which the core network apparatus informs the mobile communication terminal having received an incoming call of a stop of the voice call reception processing, the caller side SMS delivery control being a control in which the core network apparatus informs a terminal of a caller of a stop of the voice call transmission processing.

According to an exemplary aspect of the present invention, there is provided a wireless communication method of a wireless communication system which includes: a wireless base station which communicates with a mobile communication terminal; a core network apparatus which is a higher-level apparatus of the wireless base station; and a gateway which relays between the wireless base station and the core network apparatus, the method including: a call transmission and reception number acquiring step of acquiring, by the wireless base station, call transmission and reception number information from a call setting request signal sent from the core network apparatus after detecting a voice call reception to the mobile communication terminal within a communication service area; a determination step of determining, by the wireless base station, whether to stop voice call reception processing or voice call transmission processing with reference to determination information; and a signal processing step of establishing, by the wireless base station, a data link not with the mobile communication terminal within the communication service area but only with the core network apparatus, when the processing is determined to be stopped, the signal processing step including informing a terminal which is a caller of the stop of the voice call reception through the core network apparatus.

According to an exemplary aspect of the present invention, there is provided a wireless communication method of a wireless communication system which includes: a wireless base station which communicates with a mobile communication terminal; a core network apparatus which is a higher-level apparatus of the wireless base station; and a gateway which relays between the wireless base station and the core network apparatus, the method including: a call transmission and reception number acquiring step of acquiring, by the gateway, call transmission and reception number information from a call setting request signal sent from the core network apparatus after detecting a voice call reception to the mobile communication terminal within a communication service area or a voice call transmission from the mobile communication terminal within of the communication service area in the wireless base station; a determination step of determining, by the gateway, whether to stop voice call reception processing or voice call transmission processing with reference to determination information; and a signal processing step of informing, by the gateway, the core network apparatus of a message including a determination result when the processing is determined to be stopped, the signal processing step including performing a receiver side SMS delivery control and/or a caller side SMS delivery control by using the call transmission and reception number information acquired in the call transmission and reception number acquiring means, the receiver side SMS delivery control being a control in which the gateway informs the mobile communication terminal having received an incoming call of a stop of the voice call reception processing, the caller side SMS delivery control being a control in which the gateway informs a terminal of a caller of a stop of the voice call transmission processing.

A computer-readable medium according to an exemplary aspect of the present invention stores a program for causing a computer to execute the above-mentioned wireless communication control processing.

Advantageous Effects of Invention

A wireless base station, a wireless communication system, a wireless communication control method, and a computer-readable medium storing a program according to exemplary aspects of the present invention can limit services in a specific location without changing any function of a mobile communication terminal.

DESCRIPTION OF EMBODIMENTS

Hereinafter, an exemplary embodiment to which the present invention is applied will be described in detail with reference to the drawings. In this exemplary embodiment, a wireless base station according to the present invention is applied to a femto wireless base station FAP (Femto Access Point). This femto wireless base station is installed in a specific location to regulate an incoming call of a mobile communication terminal within a communication service area and an outgoing call from a mobile terminal within the communication service area (voice call reception). In the following exemplary embodiment, description is given assuming that the wireless base station is a femto wireless base station. However, the wireless base station is not limited to the femto wireless base station as long as the wireless base station can regulate the voice call reception of a mobile communication terminal in a specific location. For example, the wireless base station may be a micro wireless base station other than the femto wireless base station.

The femto wireless base station is a wireless base station having a wireless cover area of about a few tens of meters. Thus, the femto wireless base station has such an extremely narrow wireless cover area. Accordingly, the femto wireless base station to which the present application is applied is installed in a location, such as a theater, a library, a museum, or a train, where the voice call reception is desired to be inhibited only in a limited area, thereby making it possible to limit various services for each mobile communication terminal within the communication service area without changing any function of the mobile communication terminal.

First Exemplary Embodiment

Figure 1:
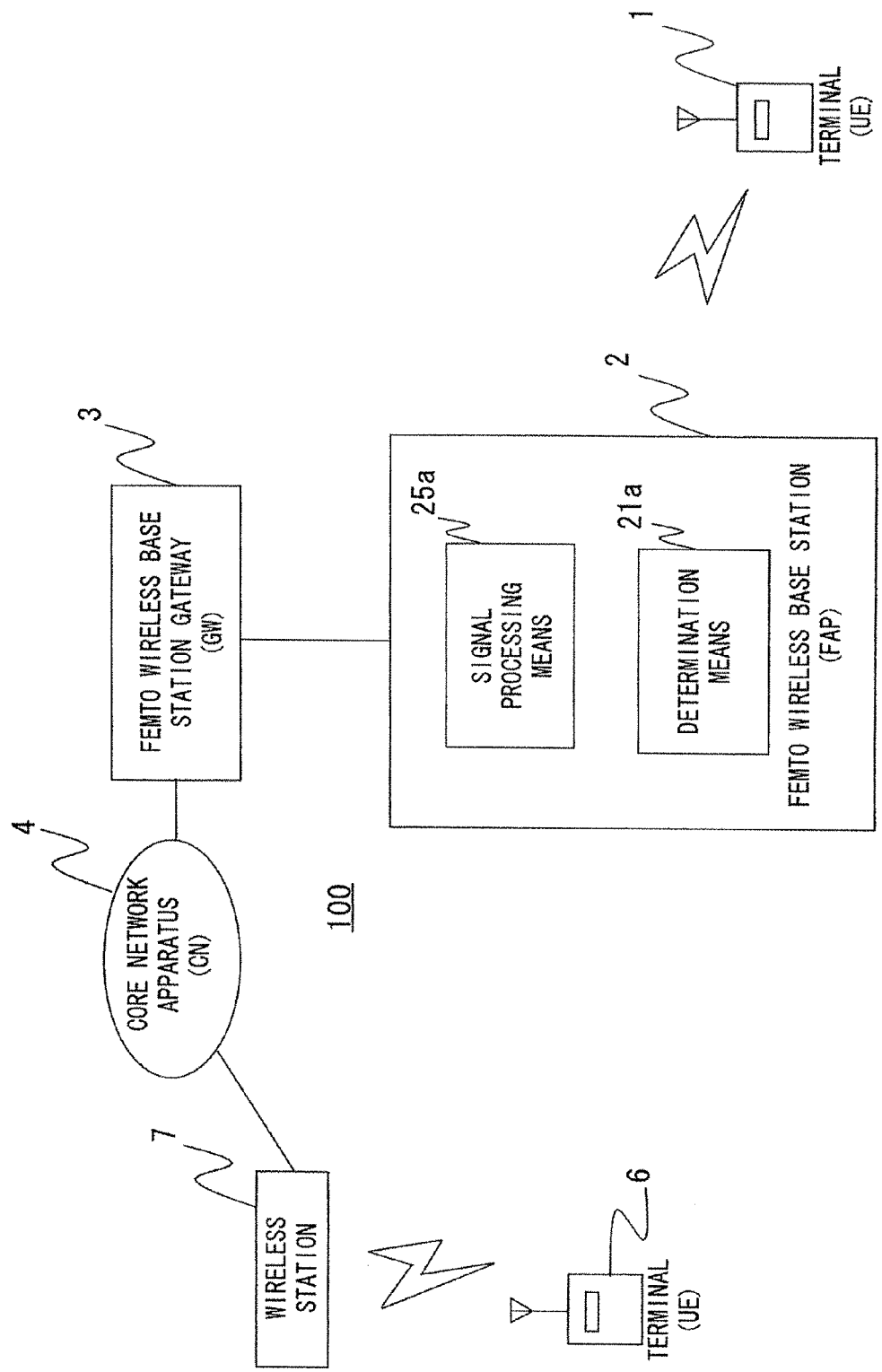
FIG. 1 is a diagram showing a wireless communication system according to a first exemplary embodiment of the present invention.

FIG. 1 is a diagram showing a wireless communication system according to a first exemplary embodiment of the present invention. A wireless communication system 100 includes a femto wireless base station FAP2 that communicates with a mobile communication terminal UE (User Equipment) 1; a core network apparatus CN (Core Network) (also referred to as "mobile switching center" or "macro wireless base station") 4 which is a higher-level apparatus of the femto wireless base station FAP2; and a femto wireless base station gateway GW (Gateway) 3 that relays between the femto wireless base station FAP2 and the core network apparatus CN4. The core network apparatus CN4 is, for example, a third-generation wireless base station. Herein, an example is described in which another terminal UE6 transmits a call to the mobile communication terminal UE2, or the mobile communication terminal UE2 transmits a call to another terminal UE6, and another terminal UE6 communicates with the mobile communication terminal UE1 through a wireless base station 7.

The femto wireless base station FAP2 includes determination means 21a and signal processing means 25a. Upon detecting a voice call reception from a certain terminal UE6 to the mobile communication terminal UE1 within a communication service area or a voice call transmission from the mobile communication terminal UE1 within the communication service area to a certain terminal UE6, the determination means 21a determines whether to stop the voice call reception processing or the voice call transmission processing with reference to determination information. When the determination means determines to stop the processing, the signal processing means 25a informs the core network apparatus CN4, which is a higher-level apparatus, of a message (control signal) including a determination result. In this exemplary embodiment, a mode in which the femto wireless base station FAP2 stops the voice call reception processing or the voice call transmission processing for all terminals within the communication service area is referred to as a forced silent mode.

The determination information is included in each femto wireless base station FAP2, and is set by a carrier of a higher-level apparatus, for example. The determination information is information for setting whether to inhibit the voice call reception processing or the voice call transmission processing (forced silent mode). The determination means 21a determines whether or not the own wireless base station is a particular wireless base station for setting a terminal within the communication service area to the forced silent mode, with a completion of a call setting request from the core network apparatus CN4 to the mobile communication terminal UE 1 as a trigger, or by using a request for establishing a data link from the signal processing means 25a to the core network apparatus CN4 as a trigger.

The signal processing means 25a may use a message such as SMS (Short Message Service) to inform the stop of the voice call reception processing or the voice call transmission processing, a caller number, a receiver number, as well as area information of a nearest service area in case call transmission and reception cannot be made in the current area, for example.

Herein, the wireless communication system 100 according to this exemplary embodiment may include an SMS mail server (not shown) connected to the core network apparatus CN4. Instead of the femto wireless base station FAP2, the SMS mail server may transmit a message indicating that the service is inhibited to the mobile communication terminal UE1 and the terminal UE6.

Next, operation of the wireless communication system 100 according to this exemplary embodiment will be briefly described.

A certain terminal UE6 sends a request for voice call reception to the mobile communication terminal UE1 within the communication service area of the femto wireless base station FAP2. In this case, the core network apparatus CN4 performs paging on the mobile communication terminal UE1, thereby starting call connection processing between the mobile communication terminal UE1 and the core network apparatus CN4. During the call connection processing, the core network apparatus CN4 sends a data link establishment request to the femto wireless base station FAP2. At this time, the determination means 21a of the femto wireless base station FAP2 determines whether or not the own wireless base station is a particular wireless base station for inhibiting the voice call reception of the mobile communication terminal within the communication service area, based on the determination information. When determining that the own wireless base station is a particular wireless base station, the femto wireless base station FAP2 rejects the request to thereby interrupt the call connection processing. The femto wireless base station FAP2 acquires telephone numbers of a caller side terminal UE and a receiver side terminal UE from a call setting request message, and delivers a message indicative of the forced silent mode by an SMS message.

In this exemplary embodiment, the femto wireless base station FAP2 is installed in a location where the voice call reception is desired to be inhibited, for example. The femto wireless base station FAP2 holds the determination information for setting the forced silent mode. Upon reception of a voice call to the terminal UE1 within the communication service area of the femto wireless base station FAP2, the femto wireless base station FAP2 rejects the data link establishment request during the call connection processing in accordance with the determination information. This makes it possible to inhibit the voice call reception of the terminal within the communication service area. The femto wireless base station FAP2 has a function of delivering the SMS message. This makes it possible to inform one or both of the caller side terminal UE6 and the receiver side terminal UE1 of the interruption of the voice call reception processing. In other words, the voice call reception in a specific location can be inhibited and the mobile communication terminal UE1 can be set to the forced silent mode, without changing any function of the mobile communication terminal UE1.

Second Exemplary Embodiment

Figure 2:
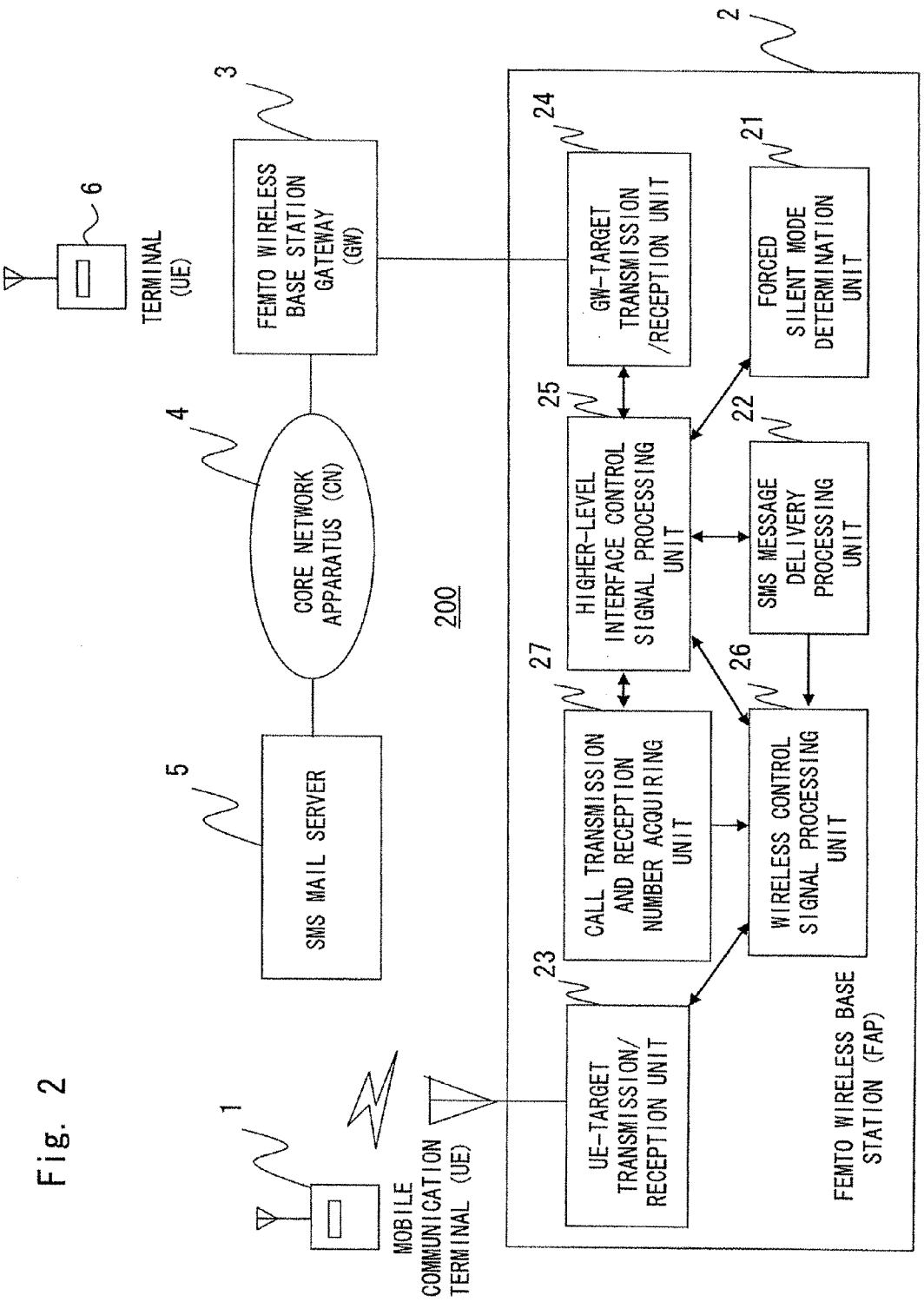
FIG. 2 is diagram showing a wireless communication system 200 according to an exemplary embodiment of the present invention.

Next, a second exemplary embodiment of the present invention will be described. FIG. 2 shows a diagram showing a wireless communication system 200 according to this exemplary embodiment. In the following description, the same components are denoted by the same reference numerals and a detailed description thereof is omitted.

As shown in FIG. 2, the wireless communication system 200 according to this exemplary embodiment includes the femto wireless base station FAP2, the femto wireless base station gateway GW3, and the core network apparatus CN4. In this exemplary embodiment, description is given assuming that the mobile communication terminal UE1 is a terminal within the communication service area of the femto wireless base station FAP2 and the terminal UE6 is a terminal that makes an outgoing call to the terminal (mobile communication terminal UE1) within the communication service area of the femto wireless base station FAP2 or a terminal that receives an incoming call from the mobile communication terminal UE1.

The femto wireless base station FAP2 further includes a forced silent mode determination unit 21, an SMS message delivery processing unit 22, a UE-target transmission/reception unit 23, a GW-target transmission/reception unit 24, a higher-level interface control signal processing unit 25, a wireless control signal processing unit 26, and a call transmission and reception number acquiring unit 27.

Each device and each block will be described in detail below.

The mobile communication terminal UE1 is a third-generation portable phone (terminal), and has a function of transmitting and receiving user data such as a voice call or an SMS message. The mobile communication terminal UE1 also has a function of establishing a wireless signal link between the mobile communication terminal UE1 and the femto wireless base station FAP2. Furthermore, the mobile communication terminal UE1 has a function of processing an upper-layer control signal between the mobile communication terminal UE1 and the core network apparatus CN4.

In this exemplary embodiment, the femto wireless base station FAP2 may be a femto wireless base station for use in a house or a small-scale office. The femto wireless base station FAP2 has a function of establishing a wireless signal link between the mobile communication terminal UE1 and the femto wireless base station FAP2. The femto wireless base station FAP2 also has a function of passing and transferring an upper-layer control signal between the mobile communication terminal UE1 and the core network apparatus CN4. Furthermore, the femto wireless base station FAP2 has a function of performing processing for access permission/non-permission of the mobile communication terminal UE1 to the femto wireless base station gateway GW3.

The femto wireless base station gateway GW3 is a gateway for connecting the femto wireless base station FAP2 and the core network apparatus CN4. The femto wireless base station gateway GW3 has a function of relaying between the femto wireless base station FAP2 and the core network apparatus CN4 and transferring a control signal and user data. The femto wireless base station gateway GW3 also has a function of performing processing for access permission/non-permission of the mobile communication terminal UE1 from the femto wireless base station FAP2.

The core network apparatus CN4 is, for example, a third-generation mobile switching network which is connected to a terminal in another network or an SMS mail server and has a function of relaying user data such as a voice call or an SMS message. The core network apparatus CN4 also has a function of processing an upper-layer control signal between the mobile communication terminal UE1 and the core network apparatus CN4.

Next, each block of the femto wireless base station FAP2 will be described. First, the forced silent mode determination unit 21 includes determination information indicating whether to set the mobile communication terminal within the communication service area of the femto wireless base station FAP2 to the forced silent mode. The determination information is information in which a portable phone carrier sets "operation" or "non-operation" in advance, for example. The forced silent mode determination unit 21 informs the higher-level interface control signal processing unit 25 of a determination result, that is, information as to whether to set the mobile communication terminal to the forced silent mode, in response to an inquiry from the higher-level interface control signal processing unit 25.

The SMS message delivery processing unit 22 has a function of performing SMS message delivery processing on the mobile communication terminal UE1 and the SMS mail server through the wireless control signal processing unit 26 and the higher-level interface control signal processing unit 25.

The UE-target transmission/reception unit 23 includes an interface for allowing the femto wireless base station FAP2 to communicate with the mobile communication terminal UE1, and relays data transmission/reception between the mobile communication terminal UE1 and the wireless control signal processing unit 26.

The GW-target transmission/reception unit 24 includes an interface for allowing the femto wireless base station FAP2 to communicate with the femto wireless base station gateway GW3, and relays data transmission/reception between the femto wireless base station gateway GW3 and the higher-level interface control signal processing unit 25.

The higher-level interface control signal processing unit 25 has a function of processing higher-level interface control signals sent from the core network apparatus CN4 and the femto wireless base station the gateway GW3. Further, the higher-level interface control signal processing unit 25 performs processing depending on contents of a message contained in the received higher-level interface control signals.

The wireless control signal processing unit 26 has a function of processing a wireless control signal sent from the mobile communication terminal UE1. Further, the wireless control signal processing unit 26 performs processing depending on contents of a message contained in the received wireless control signal.

The call transmission and reception number acquiring unit 27 has a function of acquiring a call transmission and reception number from a call setting request message transferred from the higher-level interface control signal processing unit 25. Further, the call transmission and reception number acquiring unit 27 holds telephone numbers of the caller side terminal UE 6 and the receiver side mobile communication terminal UE1.

Figure 3:
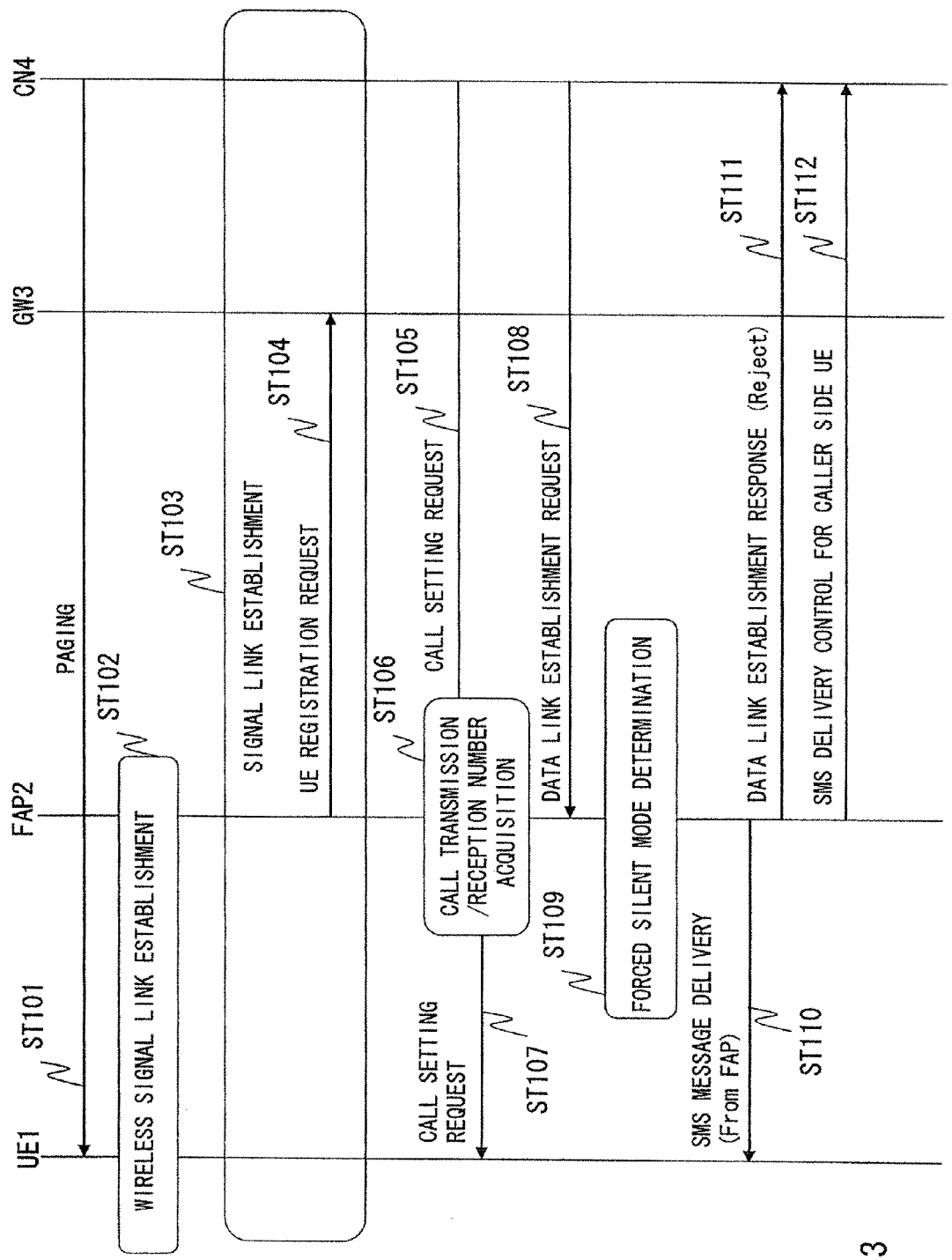
FIG. 3 is a sequence diagram showing operation according to an exemplary embodiment of the present invention.

Next, operation according to this exemplary embodiment will be described. The wireless communication system 200 according to this exemplary embodiment carries out call processing and SMS message delivery in the following processes (1) to (6) when a voice call reception request is sent to from the terminal UE6 in another network to the mobile communication terminal UE1 within the communication service area of the femto wireless base station FAP2. FIG. 3 is a sequence diagram showing the operation according to this exemplary embodiment.

(1) The mobile communication terminal UE1 is called by paging.
(2) A wireless signal link (control plane) is established between the mobile communication terminal UE1 and the femto wireless base station FAP2.
(3) A signal link (control plane) is established between the mobile communication terminal UE1 and the core network apparatus CN4.
(4) A call setting request message is exchanged between the mobile communication terminal UE1 and the core network apparatus CN4.
(5) A request for establishing a data link (user plane) between the mobile communication terminal UE1 and the core network apparatus CN4 is rejected.
(6) SMS message delivery processing is performed on the receiver side mobile communication terminal UE1 and the caller side terminal UE6.

In this exemplary embodiment, the terminal UE6 is illustrated as a mobile communication terminal by way of example, like the mobile communication terminal UE1, but the terminal 6 may be a fixed-line phone.

First, a paging process will be described. When another terminal UE6 sends a voice call reception request to the mobile communication terminal UE1, the core network apparatus CN4 embeds a voice call reception message into a control signal (higher-level interface control signal) defined by an upper layer protocol, and transmits the control signal to the femto wireless base station FAP2 through the femto wireless base station gateway GW3. The higher-level interface control signal processing unit 25 of the femto wireless base station FAP2 receives the higher-level interface control signal through the GW-target transmission/reception unit 24. Then, the higher-level interface control signal processing unit 25 extracts a paging message from the higher-level interface control signal, and transfers the paging message to the wireless control signal processing unit 26. The wireless control signal processing unit 26 embeds the voice call reception message into the wireless control signal, and informs the mobile communication terminal UE1 within the area of the femto wireless base station FAP2 of the message through the UE-target transmission/reception unit 23 (step ST101). This process is a typical process in a wireless communication system including the femto wireless base station FAP2 and the femto wireless base station gateway GW3.

Second, a process for establishing a wireless signal link will be described. The mobile communication terminal UE1 having received the voice call reception message exchanges signals with the mobile communication terminal UE1 and the wireless control signal processing unit 26 of the femto wireless base station FAP2. Then, a wireless signal link is established between the mobile communication terminal UE1 and the femto wireless base station FAP2 (step ST102). This process is a typical process in a wireless communication system including the femto wireless base station FAP2 and the femto wireless base station gateway GW3.

Third, a process for establishing a signal link will be described. After the establishment of the wireless signal link, a signal link is established by exchanging control signals among the mobile communication terminal UE1, the femto wireless base station FAP2, the femto wireless base station gateway GW3, and the core network apparatus CN4. This makes it possible to transfer a higher-level interface control signal between the mobile communication terminal UE1 and the core network apparatus CN4 (step ST103). During the establishment of the signal link by the signal link, the higher-level interface control signal processing unit 25 transmits a UE registration request signal to the femto wireless base station gateway GW3. The signal is used to perform an access control for the mobile communication terminal UE1 which has tried to use the femto wireless base station FAP2 (step ST104). This process is a typical process in a wireless communication system including the femto wireless base station FAP2 and the femto wireless base station gateway GW3.

Fourth, exchange of a call setting request message will be described. After the establishment of the signal link, the core network apparatus CN4 transmits the call setting request message to the mobile communication terminal UE1. The call setting request message is one of the control signals transmitted among the components from the mobile communication terminal UE1 to the core network apparatus CN4 through the femto wireless base station FAP2. This call setting request message is embedded into the higher-level interface control signal and is received by the higher-level interface control signal processing unit 25 of the femto wireless base station FAP2 (step ST105).

The higher-level interface control signal processing unit 25 extracts a control signal from the received higher-level interface control signal, and transfers the control signal to the wireless control signal processing unit 26. The typical higher-level interface control signal processing unit 25 does not check the type of the extracted control signal, but the higher-level interface control signal processing unit 25 according to this exemplary embodiment determines whether the received wireless signal is a call setting request message or not. Herein, when determining that the received wireless signal is the call setting request message, the extracted control signal (call setting request message) is transferred not to the wireless control signal processing unit 26 but to the call transmission and reception number acquiring unit 27 (step ST106).

The call transmission and reception number acquiring unit 27 acquires a call transmission and reception number from the call setting request message transferred from the higher-level interface control signal processing unit 25, and holds the information. The call transmission and reception number acquiring unit 27 transfers the call setting request message to the wireless control signal processing unit 26. The wireless control signal processing unit 26 embeds the call setting request message into the wireless control signal, and transmits the wireless control signal to the mobile communication terminal UE1 (step ST107).

Fifth, a process for establishing a data link will be described. After exchange of the call setting request message, establishment of a data link is started with transmission of a data link establishment request message from the core network apparatus CN4 to the femto wireless base station FAP2 as a trigger. The data link establishment request message is embedded into the higher-level interface control signal, and is transmitted from the core network apparatus CN4 to the interface control signal processing unit 25 of the upper femto wireless base station FAP2 (step ST108).

Upon receiving the data link establishment request message, the higher-level interface control signal processing unit 25 according to this exemplary embodiment accesses the forced silent mode determination unit 21. As described above, the forced silent mode determination unit 21 has determination information indicating whether or not the femto wireless base station FAP2 sets the terminal within the communication service area to the forced silent mode, and performs determination as to whether to set the terminal within the communication service area to the forced silent mode (step ST109). The forced silent mode determination unit 21 informs the higher-level interface control signal processing unit 25 of a determination result.

The higher-level interface control signal processing unit 25 embeds a data link establishment response message into the higher-level interface control signal, and transmits the higher-level interface control signal to the core network apparatus CN4.

Sixth, a process for delivering an SMS message will be described. The higher-level interface control signal processing unit 25 acquires call transmission and reception number information which is held in the call transmission and reception number acquiring unit 27. Further, the higher-level interface control signal processing unit 25 requests the SMS message delivery processing unit 22 to inform the call transmission and reception number and to perform SMS message delivery processing. The SMS message delivery processing unit 22 generates an SMS message based on the call transmission and reception number information. The SMS message includes information indicating that the mobile communication terminal UE1 is located within an area in which voice call reception is inhibited and voice call reception processing is rejected, telephone numbers of a caller and a receiver, and area information of a service area, for example. Note that the area information indicates that the current area within a 20-m radius is not a service area but the other area is a service area, for example.

Delivery of the SMS message to the receiver side mobile communication terminal UE1 will be described. First, the generated SMS message is transferred to the wireless control signal processing unit 26. The wireless control signal processing unit 26 embeds the SMS message in the wireless control signal, and directly transmits the wireless control signal to the mobile communication terminal UE1 which is a receiver side terminal (step ST110). Further, when the determination information is configured to set the forced silent mode, the wireless control signal processing unit 26 sends the data link establishment response message in response to the data link establishment request from the core network apparatus CN4. At this time, the higher-level interface control signal processing unit 25 embeds a parameter for rejecting the establishment of the data link into the data link establishment response message. As a result, the call connection processing for the voice call is stopped (step ST111).

Next, delivery of SMS message to the caller side terminal UE6 will be described. First, a signal link (control plane) and a data link (user plane) are established among the femto wireless base station FAP2, the femto wireless base station gateway GW3, the core network apparatus CN4, and the SMS mail server 5. Then, the SMS message delivery processing unit 22 transfers, to the higher-level interface control signal processing unit 25, the information included in the SMS message, i.e., the information indicating that the mobile communication terminal UE1 is located within an area in which voice call reception is inhibited and voice call reception processing is rejected, telephone numbers of a caller and a receiver, and area information of a service area. The higher-level interface control signal processing unit 25 embeds the information into the higher-level interface control signal and transmits it to the SMS mail server (step ST112). The SMS mail server delivers the message (mail) including the information to the terminal UE6.

Advantageous effects of the wireless communication system 200 according to this exemplary embodiment will be described. A first advantageous effect is that the voice call reception can be inhibited in the service area of the femto wireless base station FAP2, thereby making it possible to set each terminal within the communication service area to the forced silent mode in a specific location to prevent any public nuisance. Provision of the function of inhibiting the voice call reception in the femto wireless base station FAP2 enables inhibition of the voice call reception in all the mobile communication terminals UE1 existing in the area of the femto wireless base station FAP2 without changing any function of each mobile communication terminal UE1.

A second advantageous effect is that it is only necessary to change the functions of the femto wireless base station FAP2 in the wireless communication system 200 according to exemplary embodiment. In the application of this system, there is no need to add a special function to the terminal UE. Accordingly, the voice call reception can be inhibited regardless of the function of the mobile communication terminal UE.

A third advantageous effect is that voice call reception can be informed. Delivery of the SMS message to the mobile communication terminal UE1 is allowed, thereby making it possible to inform the voice call reception and the telephone number of the caller by the SMS message.

Third Exemplary Embodiment

Figure 4:
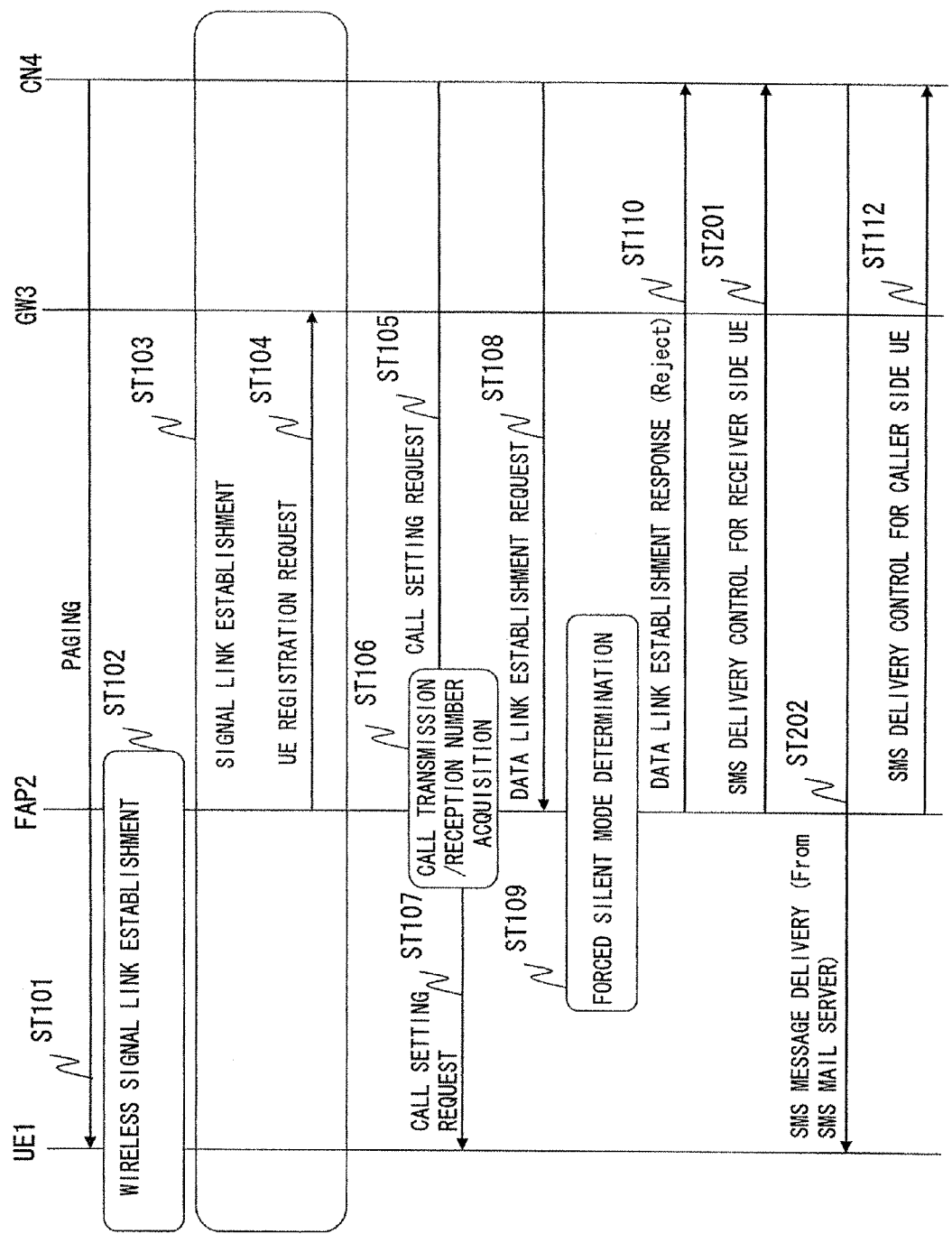
FIG. 4 is a sequence diagram showing operation according to an exemplary embodiment of the present invention.

Next, a third exemplary embodiment of the present invention will be described. FIG. 4 is a sequence diagram showing operation of a wireless communication system according to this exemplary embodiment. The wireless communication system according to this exemplary embodiment includes new steps, i.e., SMS message delivery steps ST201 and ST202, in place of the SMS message delivery step ST111 in the sequence of the second exemplary embodiment shown in FIG. 3.

The femto wireless base station FAP2 establishes a signal link (control plane) and a data link (user plane) among the femto wireless base station FAP2, the femto wireless base station gateway GW3, the core network apparatus CN4, and the SMS mail server 5. Then, the femto wireless base station FAP2 transfers information to be included in an SMS message to the higher-level interface control signal processing unit 25. The higher-level interface control signal processing unit 25 embeds the information into a higher-level interface control signal and transmits it to the SMS mail server 5 through the femto wireless base station gateway GW3 and the core network apparatus CN4 (step ST201). The SMS mail server generates the SMS message based on the received information and delivers the SMS message to the receiver side mobile communication terminal UE1 (step ST202).

Thus, this exemplary embodiment differs from the second exemplary embodiment in that the femto wireless base station FAP2 does not directly deliver the SMS message to the mobile communication terminal UE1 (receiver terminal) and the SMS mail server 5 delivers the message. Therefore, the wireless communication system according to this exemplary embodiment eliminates the need for the SMS message signal processing unit 22. Also in this exemplary embodiment, as with the first exemplary embodiment, the voice call reception in a specific location can be inhibited and the mobile communication terminal UE1 can be set to the forced silent mode without changing any function of the mobile communication terminal UE1.

Fourth Exemplary Embodiment

Figure 5:
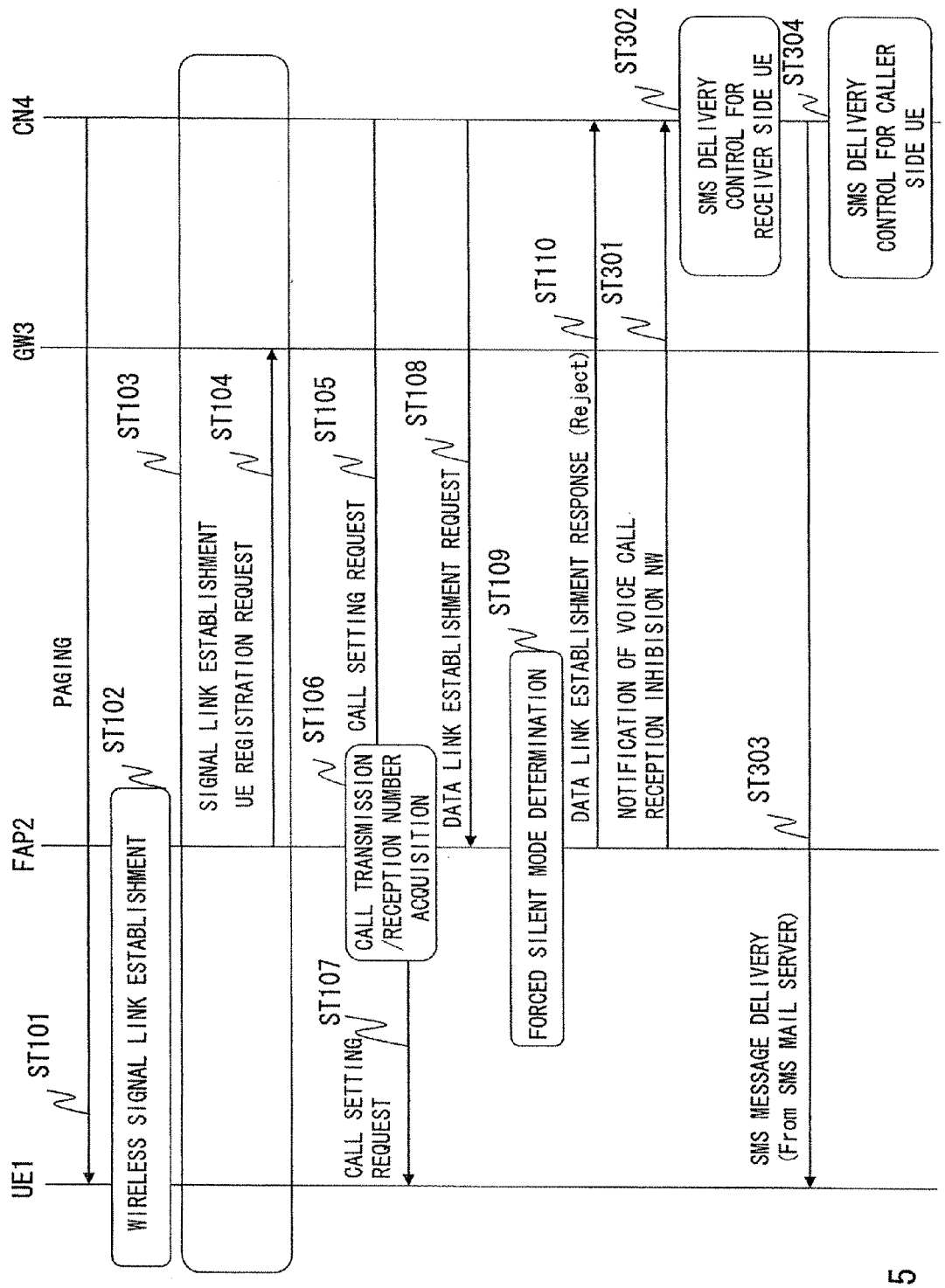
FIG. 5 is a sequence diagram showing operation according to an exemplary embodiment of the present invention.

A fourth exemplary embodiment of the present invention will be described. FIG. 5 is a sequence diagram showing operation of a wireless communication system according to this exemplary embodiment. The wireless communication system according to this exemplary embodiment includes steps ST301 to ST304 in place of steps ST111 and ST112 involved in delivery of an SMS message in the sequence of the second exemplary embodiment shown in FIG. 3.

The higher-level interface control signal processing unit 25 of the femto wireless base station FAP2 does not generate any SMS message in this exemplary embodiment, and informs voice call reception inhibition (NW). By informing the voice call reception inhibition NW, the information to be included in the SMS message is transferred to the core network apparatus CN4 (step ST301). Upon receiving the voice call reception inhibition NW information N, the core network apparatus CN4 establishes a signal link (control plane) and a data link (user plane) with the SMS mail server 5. Then, the core network apparatus CN4 transfers the information, which is included in the SMS message to be sent to the receiver side mobile communication terminal UE1, to the SMS mail server 5 (step S302). The SMS mail server 5 generates an SMS message based on the received information, and delivers the MS message to the receiver side mobile communication terminal UE1 (step ST303).

Further, upon receiving the voice call reception inhibition NW information, the core network apparatus CN4 establishes a signal link (control plane) and a data link (user plane) also with the caller side terminal UE6. Then, the core network apparatus CN4 transfers the information to be included in the SMS message for the caller side terminal UE6 to the SMS mail server 5 (step ST304). The SMS mail server 5 informs the caller side terminal UE6 that the mobile communication terminal UE1 is set to the forced silent mode.

Thus, in this exemplary embodiment, the femto wireless base station FAP2 does not have any function related to the SMS message delivery processing, but the core network apparatus CN4 has such a function. Therefore, the wireless communication system according to this exemplary embodiment eliminates the need for the SMS message signal processing unit 22. Also in this exemplary embodiment, as with the first exemplary embodiment, the voice call reception in a specific location can be inhibited and the mobile communication terminal UE1 can be set to forced silent mode without changing any function of the mobile communication terminal UE1.

Fifth Exemplary Embodiment

Figure 6:
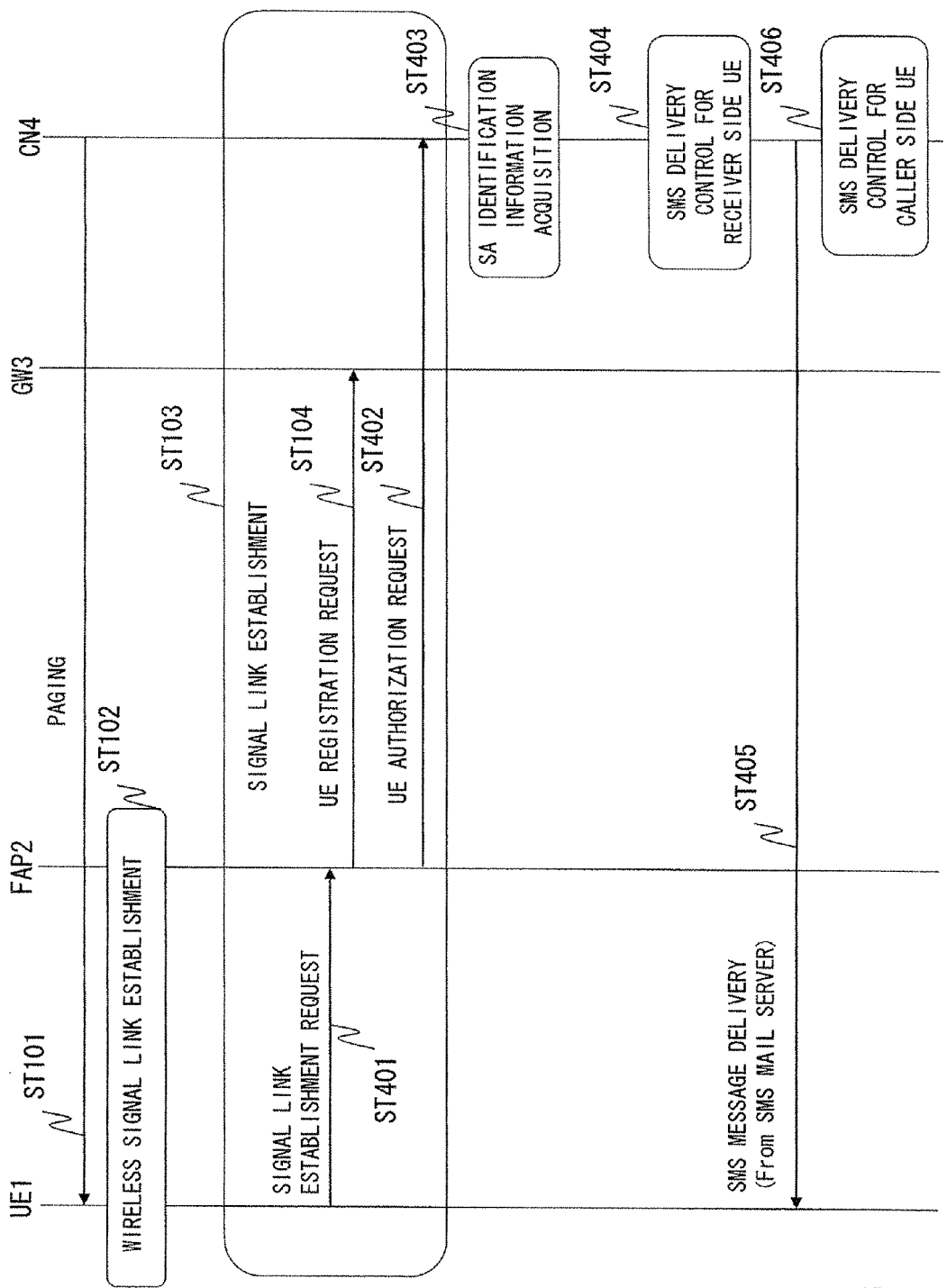
FIG. 6 is a sequence diagram showing operation according to an exemplary embodiment of the present invention.

A fifth exemplary embodiment of the present invention will be described. FIG. 6 is a sequence diagram showing operation of a wireless communication system according to this exemplary embodiment. The wireless communication system according to this exemplary embodiment includes new steps 9T401 to ST408 in place of steps ST105 to ST112 in the sequence of the second exemplary embodiment shown in FIG. 3.

The mobile communication terminal UE1 transmits the signal link establishment request message to the femto wireless base station FAP2. The message, which is embedded into the wireless control signal to be transmitted, includes information for requesting setting of a connection among the components from the femto wireless base station FAP2 to the core network apparatus CN4. This process is a part (step ST401) of the process for establishing a signal link (step ST104). The wireless control signal processing unit 26 of the femto wireless base station FAP2 transfers the message to the higher-level interface control signal processing unit 25. The higher-level interface control signal processing unit 25 starts processing for setting a connection among the components from the femto wireless base station FAP2 to the core network apparatus CN4, and embeds a UE authorization request message into the higher-level interface control signal to be transmitted to the core network apparatus CN4 (step ST402).

Herein, the UE authorization request message according to this exemplary embodiment includes SA (Service Area) identification information. The SA identification information can be set for each FAP cell by a carrier of a portable phone. The core network apparatus CN4 can identify, based on the information, the femto wireless base station FAP2 having a service area in which the mobile communication terminal UE1 is located. The core network apparatus CN4 refers to the SA identification information and information (determination information) indicating whether or not the femto wireless base station FAP2 is a particular wireless base station for setting a terminal within the communication service area of the femto wireless base station FAP2 to the forced silent mode, and correlates the SA identification information with the determination information, thereby determining whether or not the mobile communication terminal UE1 is located in the service area of the particular wireless base station (located in the service area for the voice call reception inhibition NW) (step ST304).

When determining that the mobile communication terminal UE1 is located in the service area for the voice call reception inhibition NW, the core network apparatus CN4 establishes a signal link (control plan) and a data link (user link) with the SMS mail server 5. Then, the core network apparatus CN4 transfers information to be included in the SMS message for the receiver side mobile communication terminal UE1 to the SMS mail server 5 (step ST404). The SMS mail server 5 generates the SMS message based on the received information, and delivers the SMS message to the receiver side mobile communication terminal UE1 (step ST405). Similarly, the core network apparatus CN4 establishes a signal link (control plane) and a data link (user plane) also with the caller side terminal UE6, and transfers information to be included in the SMS message for the caller side terminal UE6 to the SMS mail server 5 (step ST408).

Thus, in this exemplary embodiment, the femto wireless base station FAP2 does not have any function related to the forced silent mode determination and any function related to the SMS message delivery processing. Instead, the core network apparatus CN4 has such functions. Also in this exemplary embodiment, as with the first exemplary embodiment, the voice call reception in a specific location can be inhibited and the mobile communication terminal UE1 can be set to the forced silent mode without changing any function of the mobile communication terminal UE1.

Sixth Exemplary Embodiment

Figure 7:
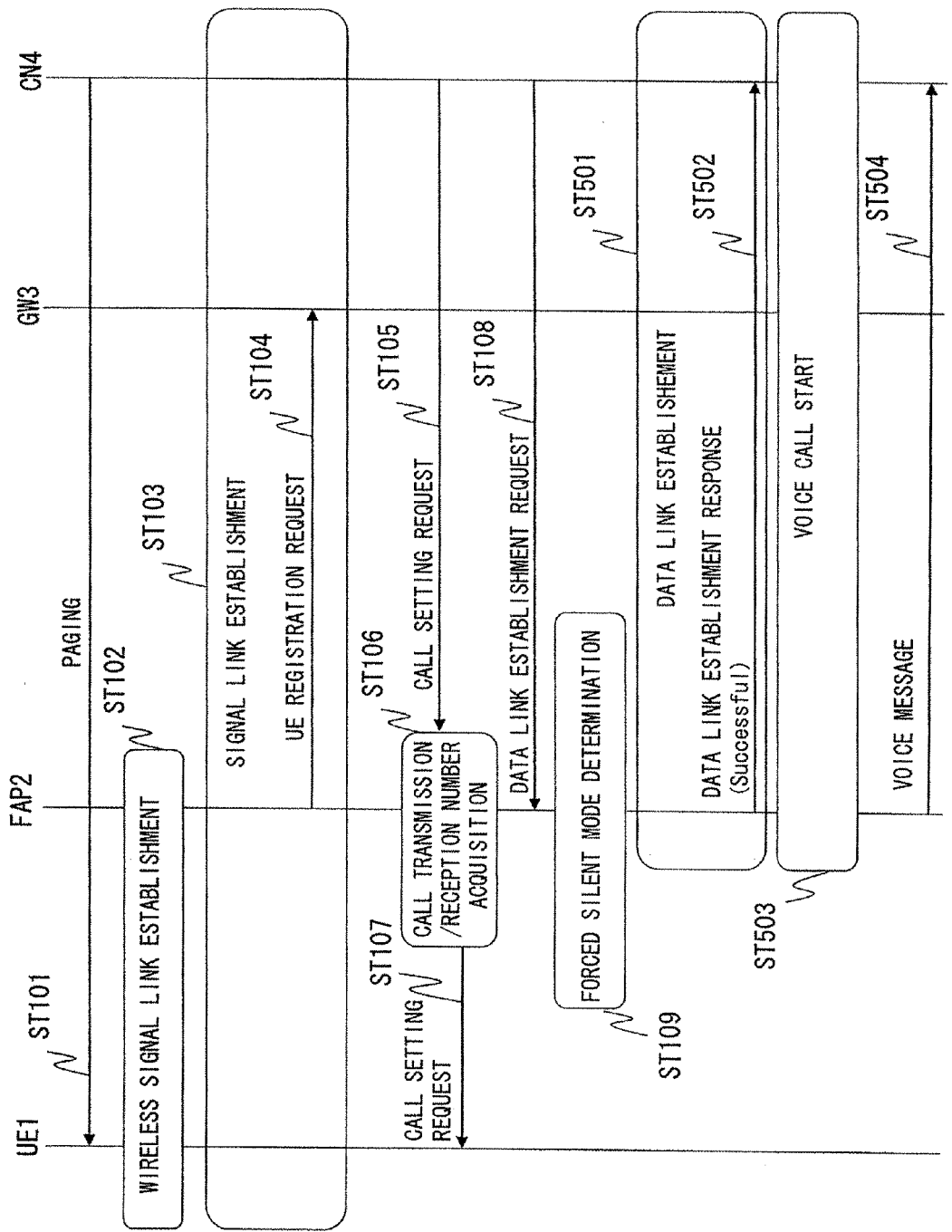
FIG. 7 is a sequence diagram showing operation according to an exemplary embodiment of the present invention.

A sixth exemplary embodiment of the present invention will be described. FIG. 7 is a sequence diagram showing operation of a wireless communication system according to this exemplary embodiment. The wireless communication system according to this exemplary embodiment includes steps ST501 to ST504 in place of steps ST110 to ST112 in the sequence of the second exemplary embodiment shown in FIG. 3.

The femto wireless base station FAP2 exchanges signals with the core network apparatus CN4, and establishes a data link among the components from the femto wireless base station FAP2 to the core network apparatus CN4 (step ST501). In a typical process for a wireless communication system including the femto wireless base station FAP2 and the femto wireless base station gateway GW3, signals are exchanged among the mobile communication terminal UE1, the femto wireless base station FAP2, the femto wireless base station gateway GW3, and the core network apparatus CN4, and a data link is established among the mobile communication terminal UE1, the femto wireless base station FAP2, the femto wireless base station gateway GW3, and the core network apparatus CN4. In this exemplary embodiment, however, a data link is established only among the components from the femto wireless base station FAP2 to the core network apparatus CN4, excluding the mobile communication terminal UE1.

The femto wireless base station FAP2 embeds the data link establishment response message into the higher-level interface control signal to be transmitted to the core network apparatus CN4. The message includes a parameter indicating that the establishment of the data link is successful (step ST502). The establishment of the data link enables voice call (step ST503). The femto wireless base station FAP2 sends information indicating that voice call reception processing is rejected, telephone numbers of a caller and a receiver, and area information of a service area, for example, to the caller side terminal UE6, not by an SMS message but by a voice message (step ST504).

Thus, in this exemplary embodiment, the femto wireless base station FAP2 establishes a data link among the components from the femto wireless base station FAP2 to the core network apparatus CN4, instead of establishing a data link among the components from the mobile communication terminal UE1 to the femto wireless base station FAP2. The femto wireless base station FAP2 can inform the caller side mobile communication terminal UE1 of the forced silent mode, not by an SMS message but by a voice message. Thus, also in this exemplary embodiment, as with the first exemplary embodiment, the voice call reception in a specific location can be inhibited and the mobile communication terminal UE1 can be set to the forced silent mode without changing any function of the mobile communication terminal UE1.

Seventh Exemplary Embodiment

Figure 8:
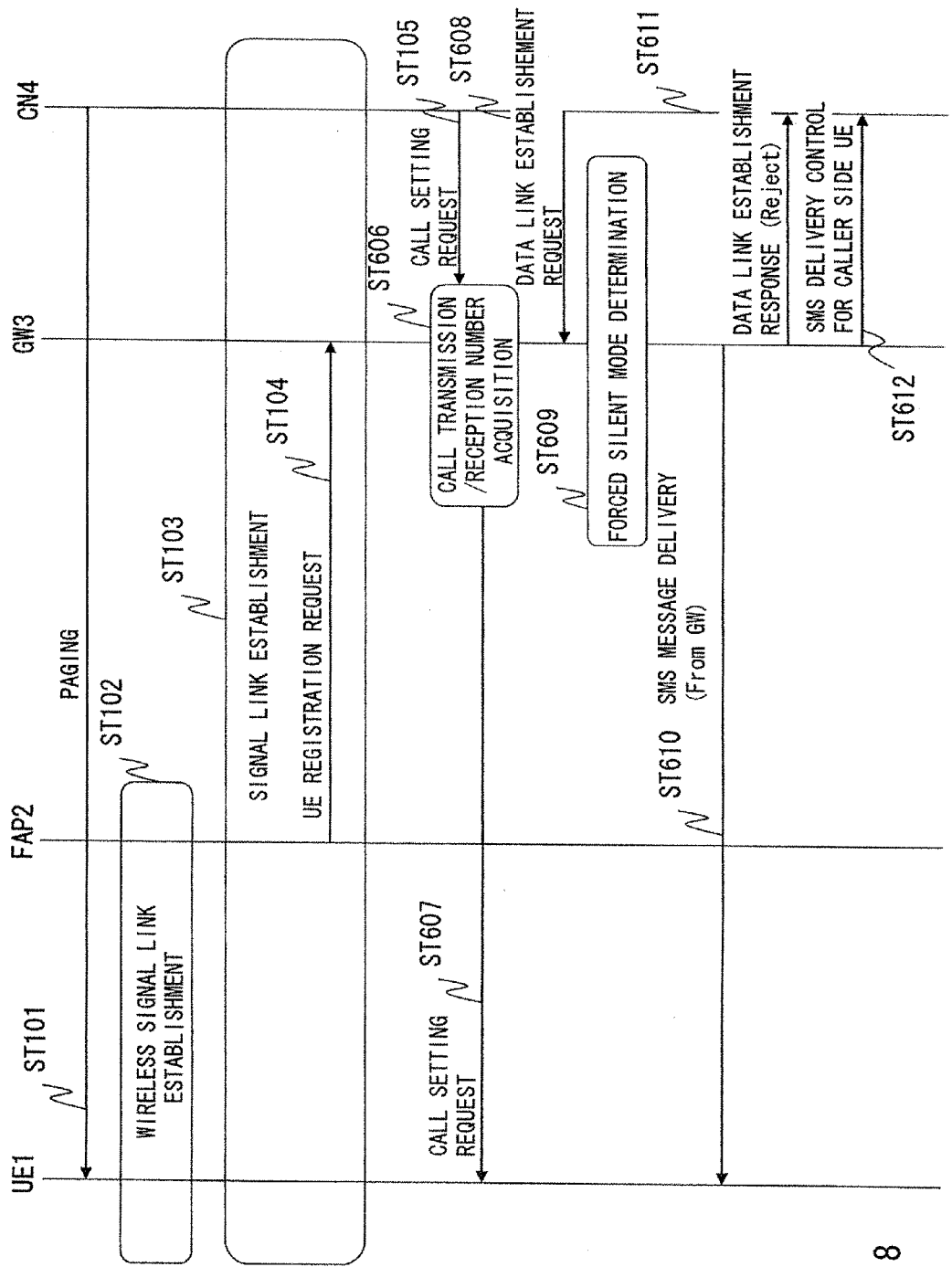
FIG. 8 is a sequence diagram showing operation according to an exemplary embodiment of the present invention.

A seventh exemplary embodiment of the present invention will be described. FIG. 8 is a sequence diagram showing operation of a wireless communication system according to this exemplary embodiment. The wireless communication system according to this exemplary embodiment includes steps ST606 to ST612 in place of steps ST106 to ST112 in the sequence of the second exemplary embodiment shown in FIG. 3.

In this exemplary embodiment, the femto wireless base station gateway GW3 has functions related to call transmission and reception number acquisition processing (step ST606) and forced silent mode determination processing (step ST609). The femto wireless base station gateway GW3 performs message processing related to a call setting request (step ST105), a call setting request (step ST607), a data link establishment request (step ST608), an SMS message delivery (step ST610), a data link establishment response (Reject) (step ST611), and SMS delivery processing for the caller side mobile communication terminal UE1 (step ST612). The femto wireless base station gateway GW3 may be configured such that the functions of the forced silent mode determination unit 21, the SMS message delivery processing unit 22, and the call transmission and reception number acquiring unit 27, for example, are added to a typical gateway configuration.

Thus, in this exemplary embodiment, each processing performed by the femto wireless base station FAP2 in the second exemplary embodiment is performed by the femto wireless base station gateway GW3. Also in this exemplary embodiment, as with the first exemplary embodiment, the voice call reception in a specific location can be inhibited and the mobile communication terminal UE1 can be set to the forced silent mode without changing any function of the mobile communication terminal UE1.

Eighth Exemplary Embodiment

Figure 9:
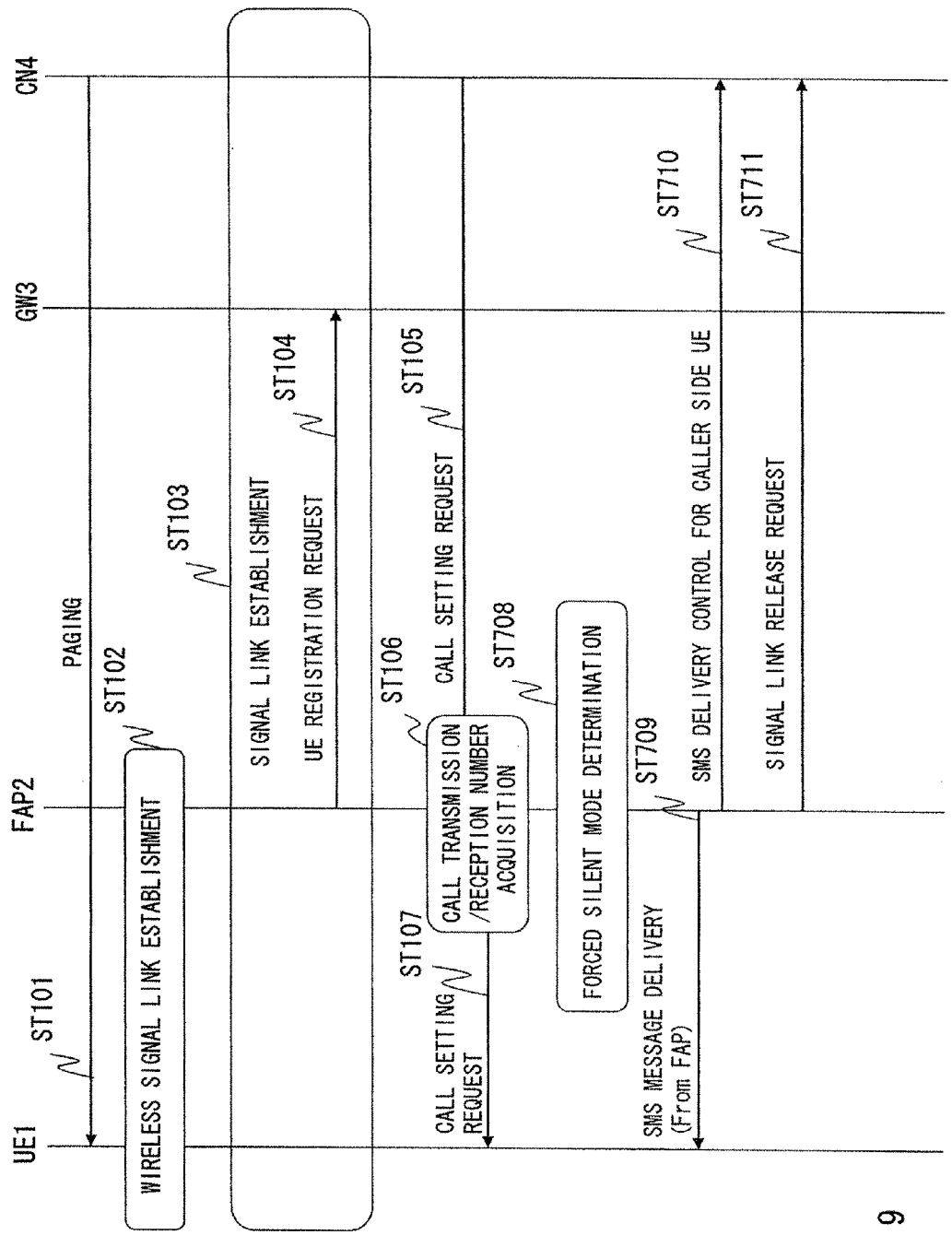
FIG. 9 is a sequence diagram showing operation according to an exemplary embodiment of the present invention.

An eighth exemplary embodiment of the present invention will be described. FIG. 9 is a sequence diagram showing operation of a wireless communication system according to this exemplary embodiment. The wireless communication system according to this exemplary embodiment includes steps ST708 to ST711 in place of steps ST108 to SR112 in the sequence of the second exemplary embodiment shown in FIG. 3.

In this exemplary embodiment, after execution of the call setting request signal processing, the femto wireless base station FAP2 carries out forced silent mode determination (step ST708). After that, the femto wireless base station FAP2 delivers an SMS message to the receiver side mobile communication terminal UE1 (step ST709). Then, the femto wireless base station FAP2 performs an SMS delivery control for the caller side terminal UE6 (step ST710). Lastly, the femto wireless base station FAP2 sends a signal link release request to the core network apparatus CN4 (step ST711).

Thus, in this exemplary embodiment, the femto wireless base station FAP2 performs the forced silent mode determination with a completion of the call setting request processing from the core network apparatus CN4 as a trigger, instead of performing the forced silent mode determination with the data link establishment request from the core network apparatus CN4 as a trigger. Then, the femto wireless base station FAP2 performs the SMS delivery and requests for releasing the signal link. Also in this exemplary embodiment, as with the first exemplary embodiment, the voice call reception in a specific location can be inhibited and the mobile communication terminal UE1 can be set to the forced silent mode without changing any function of the mobile communication terminal UE1.

Ninth Exemplary Embodiment

Figure 10:
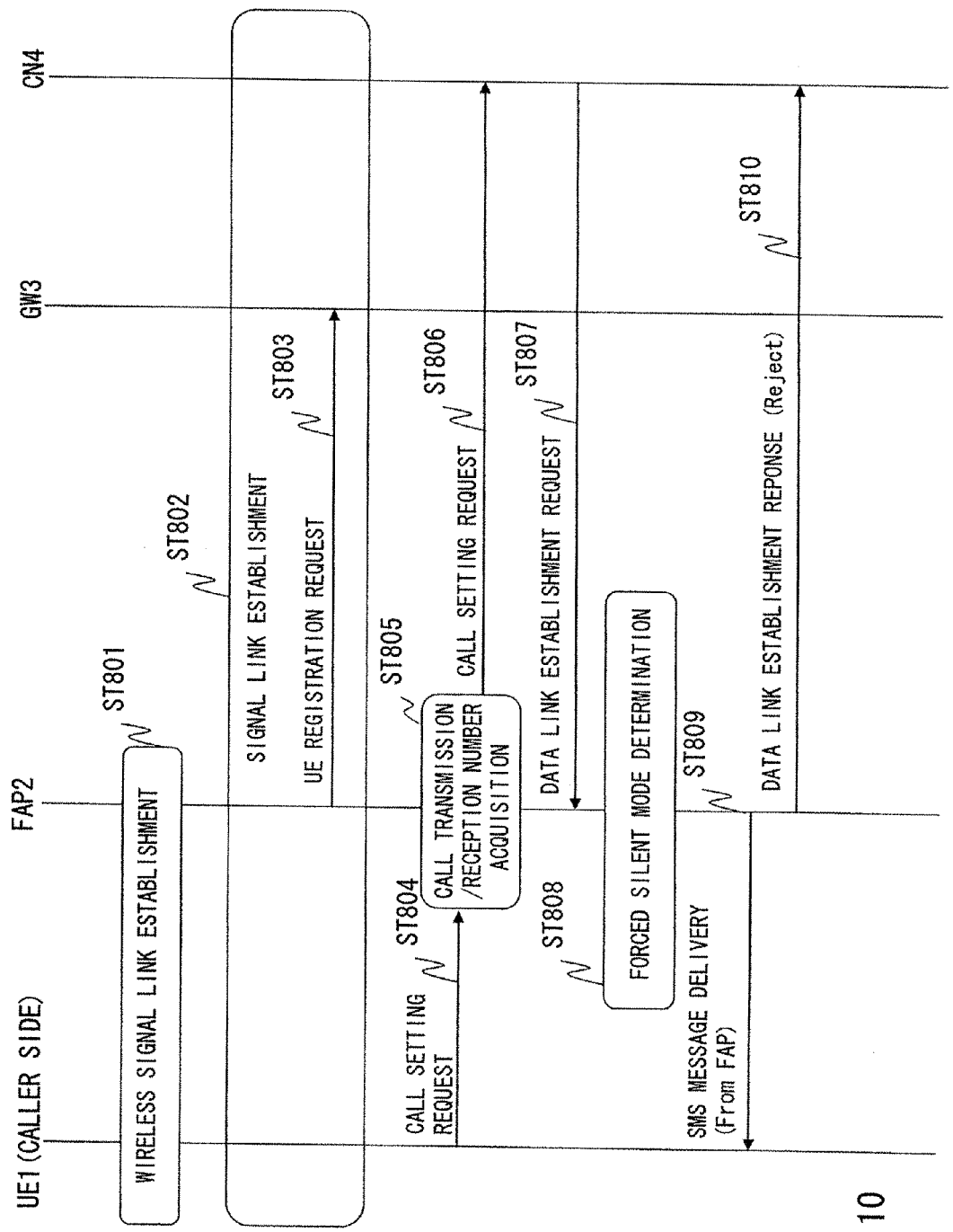
FIG. 10 is a sequence diagram showing operation according to an exemplary embodiment of the present invention.

A ninth exemplary embodiment of the present invention will be described. FIG. 10 is a sequence diagram showing operation of a wireless communication system according to this exemplary embodiment. The sequence diagram of FIG. 10 shows a case where the mobile communication terminal UE1 within the communication service area of the femto wireless base station FAP2 in the wireless communication system according to this exemplary embodiment transmits a voice call to the terminal UE6 in another network.

The mobile communication terminal UE1 establishes a wireless signal link with the femto wireless base station FAP2 (step ST801), and establishes a signal link by exchanging control signals among the mobile communication terminal UE1, the femto wireless base station FAP2, the femto wireless base station gateway GW3, and the core network apparatus CN4 (step ST802). During establishment of the signal link, the femto wireless base station FAP2 transmits the UE registration request signal to the femto wireless base station gateway GW3. This signal is used to perform an access control for the mobile communication terminal UE1 which has tried to use the femto wireless base station FAP2 (step ST803). Note that these steps are typical processes in a wireless communication system including the femto wireless base station FAP2 and the femto wireless base station gateway GW33.

After establishment of the signal link, a call setting request message is transmitted from the mobile communication terminal UE1 to the core network apparatus CN4 (step ST804). The femto wireless base station FAP2 acquires a call transmission and reception number from the call setting request message and holds the information (step ST805). The femto wireless base station FAP2 transfers the call setting request message to the core network apparatus CN4 (step ST806). After exchange of the call setting request message, establishment of a data link is started with transmission of a data link establishment request message from the core network apparatus CN4 to the femto wireless base station FAP2 (step ST807).

In this exemplary embodiment, when the femto wireless base station FAP2 is set as a base station to carry out the forced silent mode (step ST808), the femto wireless base station FAP2 generates an SMS message based on the call transmission and reception number information. The SMS message includes information indicating that the mobile communication terminal UE1 is located within an area in which voice call reception is inhibited and voice call reception processing is rejected, telephone numbers of a caller and a receiver, and area information of a service area. The SMS message is directly transmitted to the mobile communication terminal UE1 which is a caller side terminal (step ST809). After that, the femto wireless base station FAP2 embeds the data link establishment response message into the higher-level interface control signal, and transmits it to the core network apparatus CN4. The data link establishment response message includes a parameter for rejecting the establishment of the data link to stop call connection processing for the voice call (step ST810).

Thus, in this exemplary embodiment, the femto wireless base station FAP2 inhibits a voice call transmission from the mobile communication terminal UE1 within the communication service area, instead of inhibiting a voice call reception to the mobile communication terminal UE1 within the communication service area. The femto wireless base station FAP2 delivers the SMS message to the caller side mobile communication terminal UE1. Also in this exemplary embodiment, as with the first exemplary embodiment, the voice call reception in a specific location can be inhibited and the mobile communication terminal UE1 can be set to the forced silent mode without changing any function of the mobile communication terminal UE1.

Like in the third and fourth exemplary embodiments, the SMS mail server may transmit the SMS message. The message may be sent not only to the caller side mobile communication terminal UE1 but also to the receiver side terminal by text or voice. Further, like in the fifth exemplary embodiment, the SA identification information may be sent to the core network apparatus CN4, and the core network apparatus CN4 may perform the forced mode determination and transmit the SMS message, for example. Furthermore, like in the seventh exemplary embodiment, the femto wireless base station gateway GW3 may perform the forced silent mode determination and transmit the SMS message, for example. Moreover, like in the eighth exemplary embodiment, the forced silent mode determination may be carried out with a completion of the call setting request processing as a trigger.

The present invention has been described above with reference to exemplary embodiments, but the present invention is not limited to the above exemplary embodiments. The configuration and details of the present invention can be modified in various manners which can be understood by those skilled in the art within the scope of the present invention.

The above exemplary embodiments are based on the assumption that a mobile communication terminal within a communication service area of a particular base station is set to the forced silent mode to thereby limit the call transmission and reception, for example. Alternatively, other services may be limited by, for example, allowing only an information mail indicating that a terminal is located in a forced silent mode service area and preventing the other mails from being transmitted or received, or by prohibiting the use of the Internet.

For example, the above exemplary embodiments have been described as a hardware configuration, but the present the invention is not limited to thereto. Arbitrary processing can be achieved by causing a CPU (Central Processing Unit) to execute a computer program. In this case, a computer program can be provided to a computer in a form stored in various types of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g. magneto-optical disks), CD-ROM (read only memory), CD-R, CD-R/W, and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line, such as electric wires and optical fibers, or a wireless communication line.

This application is based upon and claims the benefit of priority from Japanese patent application No. 2009-152266, filed on Jun. 26, 2009, the disclosure of which is incorporated herein in its entirety by reference.

REFERENCE SIGNS LIST

1 MOBILE COMMUNICATION TERMINAL UE
2 FEMTO WIRELESS BASE STATION FAP
3 FEMTO WIRELESS BASE STATION GATEWAY GW
4 CORE NETWORK APPARATUS CN
5 SMS MAIL SERVER
6 TERMINAL UE
7 WIRELESS BASE STATION
21 FORCED SILENT MODE DETERMINATION UNIT
21a DETERMINATION MEANS
22 SMS MESSAGE DELIVERING PROCESSING UNIT
23 UE-TARGET TRANSMISSION/RECEPTION UNIT
24 GW-TARGET TRANSMISSION/RECEPTION UNIT
25 HIGHER-LEVEL INTERFACE CONTROL SIGNAL PROCESSING UNIT
25a SIGNAL PROCESSING MEANS
26 WIRELESS CONTROL SIGNAL PROCESSING UNIT
27 CALL TRANSMISSION AND RECEPTION NUMBER ACQUIRING UNIT
100 WIRELESS COMMUNICATION SYSTEM
200 WIRELESS COMMUNICATION SYSTEM

The invention claimed is:
1. A wireless communication system comprising:
a wireless base station which communicates with a mobile communication terminal;

a core network apparatus which comprises a higher-level apparatus of the wireless base station;
a gateway which relays between the wireless base station and the core network apparatus; and
an SMS mail server which is connected to the core network apparatus, wherein
the wireless base station comprises:
   a call transmission and reception number acquiring unit that acquires call transmission and reception number information from a call setting request signal sent from the core network apparatus after detecting a voice call reception to the mobile communication terminal within a communication service area or a voice call transmission from the mobile communication terminal within the communication service area;
   a determination unit that determines whether to stop voice call reception processing or voice call transmission processing with reference to determination information; and
   a signal processing unit that informs the core network apparatus of a message including a determination result when the determination unit determines to stop the processing,
the signal processing unit sends a control signal including the call transmission and reception number acquired by the call transmission and reception number acquiring unit to the SMS mail server through the core network apparatus, and
the SMS mail server performs at least one of a receiver side SMS delivery control and a caller side SMS delivery control based on the control signal, the receiver side SMS delivery control being a control in which the SMS mail server informs the mobile communication terminal having received an incoming call of a stop of the voice call reception processing, the caller side SMS delivery control being a control in which the SMS mail server informs a terminal of a caller of a stop of the voice call transmission processing.

2. The wireless communication system according to claim 1, wherein the wireless base station comprises a micro wireless base station and the core network apparatus comprises a third-generation wireless base station.

3. The wireless communication system according to claim 1, wherein the SMS mail server informs the mobile communication terminal having received an incoming call of area information of a service area.

4. A wireless communication system comprising:
a wireless base station which communicates with a mobile communication terminal;
a core network apparatus which comprises a higher-level apparatus of the wireless base station;
a gateway which relays between the wireless base station and the core network apparatus; and
an SMS mail server which is connected to the core network apparatus, wherein
the wireless base station comprises:
   a call transmission and reception number acquiring unit that acquires call transmission and reception number information from a call setting request signal sent from the core network apparatus after detecting a voice call reception to the mobile communication terminal within a communication service area or a voice call transmission from the mobile communication terminal within the communication service area;
   a determination unit that determines whether to stop voice call reception processing or voice call transmission processing with reference to determination information; and
   a signal processing unit that informs the core network apparatus of a message including a determination result when the determination unit determines to stop the processing,
the signal processing unit sends a control signal including the call transmission and reception number acquired by the call transmission and reception number acquiring unit to the core network apparatus,
the core network apparatus comprises:
   a informing unit that establishes communication with the SMS mail server and performs at least one of a receiver side SMS delivery control and a caller side SMS delivery control through the SMS mail server, the receiver side SMS delivery control being a control in which the informing unit informs the mobile communication terminal having received an incoming call of a stop of the voice call reception processing, the caller side SMS delivery control being a control in which the informing unit informs a terminal of a caller of a stop of the voice call transmission processing, and
the informing unit establishes communication with a terminal having made an outgoing call to the mobile communication terminal within the communication service area or a terminal having received an incoming call from the mobile communication terminal within the communication service area, and performs at least one of the receiver side SMS delivery control and the receiver side SMS delivery control through the SMS mail caller, the caller side SMS delivery control being a control in which the informing unit informs a terminal having received an incoming call from the mobile communication terminal within the communication service area of a stop of the voice call reception processing, the caller side SMS delivery control being a control in which the informing unit informs a terminal having made an outgoing call to the mobile communication terminal within the communication service area of a stop of the voice call transmission processing.

5. A wireless communication system comprising:
a wireless base station which communicates with a mobile communication terminal;
a core network apparatus which comprises a higher-level apparatus of the wireless base station; a gateway which relays between the wireless base station and the core network apparatus; and
an SMS mail server which is connected to the core network apparatus, wherein
the wireless base station comprises a signal processing unit that sends its own identification number to the core network apparatus after establishing communication among the mobile communication terminal, the wireless base station, the gateway, and the core network apparatus by a voice call reception to the mobile communication terminal within a communication service area or a voice call transmission from the mobile communication terminal within the communication service area,
the core network apparatus comprises:
   determination unit which has information of a wireless base station including a forced silent mode for stopping voice call reception processing or voice call transmission processing of a terminal within a communication service area, and determines whether or not the wireless base station having sent the identification number is a target base station of the forced silent mode; and a informing unit that establishes communication with the SMS mail server and performs at least one of a receiver side SMS delivery control and a caller side SMS delivery control through the SMS mail server, when the wireless base station having sent the identification number comprises the target base station, the receiver side SMS delivery control being a control in which the informing unit informs the mobile communication terminal having received an incoming call of a stop of the voice call reception processing, the caller side SMS delivery control being a control in which the informing unit informs a terminal of a caller of a stop of the voice call transmission processing.

6. The wireless communication system according to claim 5, wherein the informing unit of the core network apparatus establishes communication with a terminal having made an outgoing call to the mobile communication terminal within the communication service area or with a terminal having received an incoming call from the mobile communication terminal within the communication service area, and performs at least one of a receiver side SMS delivery control and a caller side SMS delivery control through the SMS mail server, the receiver side SMS delivery control being a control in which the informing unit informs a terminal having received an incoming call from the mobile communication terminal within the communication serves area of a stop of the voice call reception processing, the caller side SMS delivery control being a control in which the informing unit informs a terminal having made an outgoing call to the mobile communication terminal within the communication service area of a stop of the voice call transmission processing.

7. The wireless communication system according to claim 5, wherein the SMS mail server informs the mobile communication terminal having received the incoming call of area information of a service area.

8. A wireless communication system comprising:
a wireless base station which communicates with a mobile communication terminal;
a core network apparatus which comprises a higher-level apparatus of the wireless base station; and
a gateway which relays between the wireless base station and the core network apparatus, wherein
the gateway comprises:
a call transmission and reception number acquiring unit that acquires call transmission and reception number information from a call setting request signal sent from the core network apparatus after detecting a voice call reception to the mobile communication terminal within a communication service area or a voice call transmission from the mobile communication terminal within the communication service area in the wireless base station;
a determination unit that determines whether to stop voice call reception processing or voice call transmission processing with reference to determination information; and
a signal processing unit that informs the core network apparatus of a message including a determination result when the determination unit determines to stop the processing, and
the signal processing unit performs at least one of a receiver side SMS delivery control and a caller side SMS delivery control by using the call transmission and reception number information acquired by the call transmission and reception number acquiring unit, the receiver side SMS delivery control being a control in which the signal processing unit informs the mobile communication terminal having received an incoming call of a stop of the voice call reception processing, the caller side SMS delivery control being a control in which the signal processing unit informs a terminal of a caller of a stop of the voice call transmission processing.

9. The wireless communication system according to claim 8, wherein the determination unit performs the determination with a completion of a call setting request from the core network apparatus to the mobile communication terminal as a trigger.

10. The wireless communication system according to claim 8, wherein the determination unit performs the determination by using a request for establishing a data link from the signal processing unit to the core network apparatus as a trigger.

11. The wireless communication system according to claim 8, wherein the gateway informs the mobile communication terminal having received an incoming call of area information of a service area.

12. A wireless communication method of a wireless communication system which comprises: a wireless base station which communicates with a mobile communication terminal; a core network apparatus which comprises a higher-level apparatus of the wireless base station; a gateway which relays between the wireless base station and the core network apparatus; and an SMS mail server which is connected to the core network apparatus, the method comprising:
a call transmission and reception number acquiring step of acquiring, by the wireless base station, call transmission and reception number information from a call setting request signal sent from the core network apparatus after detecting a voice call reception to the mobile communication terminal within a communication service area or a voice call transmission from the mobile communication terminal within the communication service area;
a determination step of determining, by the wireless base station, whether to stop voice call reception processing or voice call transmission processing with reference to determination information;
a signal processing step of informing, by the wireless base station, the core network apparatus of a message including a determination result when the processing is determined to be stopped, the signal processing step including sending a control signal including the call transmission and reception number acquired in the call transmission and reception number acquiring step to the core network apparatus; and
an informing step of establishing, by the core network apparatus, communication with the SMS mail server to inform at least one of the mobile communication terminal having received an incoming call and a terminal of a caller of a stop of the voice call reception processing or the voice call transmission processing through the SMS mail server, the informing step including establishing communication with a terminal having made an outgoing call to the mobile communication terminal within a communication service area or with a terminal having received an incoming call from the mobile communication terminal within the communication service area, and performing at least one of a receiver side SMS delivery control and a caller side SMS delivery control through the SMS mail server, the receiver side SMS delivery control being a control in which the core network apparatus informs the mobile communication terminal having received an incoming call of a stop of the voice call reception processing, the caller side SMS delivery control being a control in which the core network apparatus informs a terminal having made an outgoing call of a stop of the voice call transmission processing.

13. A wireless communication method of a wireless communication system which comprises: a wireless base station which communicates with a mobile communication terminal; a core network apparatus which comprises a higher-level apparatus of the wireless base station; a gateway which relays between the wireless base station and the core network apparatus; and an SMS mail server which is connected to the core network apparatus, the method comprising:

- a signal processing step of sending, by the wireless base station, sending its own identification number to the core network apparatus after establishing communication among the wireless base station, the mobile communication terminal, the wireless base station, the gateway, and the core network apparatus by a voice call reception to the mobile communication terminal within a communication service area or a voice call transmission from the mobile communication terminal within the communication service area;
- a determination step of determining, by the core network apparatus, whether or not the wireless base station having sent the identification number is a target base station of a forced silent mode with reference to information of a wireless base station including the forced silent mode for stopping voice call reception processing or voice call transmission processing of a terminal within a communication service area; and
- an informing step of establishing, by the core network apparatus, communication with the SMS mail server and performing at least one of a receiver side SMS delivery control and a caller side SMS delivery control through the SMS mail server, when the wireless base station having sent the identification number comprises the target base station, the receiver side SMS delivery control being a control in which the core network apparatus informs the mobile communication terminal having received an incoming call of a stop of the voice call reception processing, the caller side SMS delivery control being a control in which the core network apparatus informs a terminal of a caller of a stop of the voice call transmission processing.

14. A wireless communication method of a wireless communication system which comprises: a wireless base station which communicates with a mobile communication terminal; a core network apparatus which comprises a higher-level apparatus of the wireless base station; and a gateway which relays between the wireless base station and the core network apparatus, the method comprising:

- a call transmission and reception number acquiring step of acquiring, by the gateway, call transmission and reception number information from a call setting request signal sent from the core network apparatus after detecting a voice call reception to the mobile communication terminal within a communication service area or a voice call transmission from the mobile communication terminal within of the communication service area in the wireless base station;
- a determination step of determining, by the gateway, whether to send a voice message with reference to determination information; and
- a signal processing step of informing, by the gateway, the core network apparatus of a message including a determination result when the processing is determined to be stopped,
- wherein the signal processing step includes performing at least one of a receiver side SMS delivery control and a caller side SMS delivery control by using the call transmission and reception number information acquired in the call transmission and reception number acquiring step, the receiver side SMS delivery control being a control in which the gateway informs the mobile communication terminal having received an incoming call of a stop of the voice call reception processing, the caller side SMS delivery control being a control in which the gateway informs a terminal of a caller of a stop of the voice call transmission processing.

* * * * *